United States Patent
Williams et al.

(10) Patent No.: US 12,500,615 B2
(45) Date of Patent: Dec. 16, 2025

(54) APPARATUS FOR SUPPORTING AMPLIFICATION AND PROCESSING OF RF SIGNALS CORRESPONDING TO A COMBINED SPECTRUM THAT INCLUDES LEGACY BANDWIDTH AND ADDITIONAL EXTENDED BANDWIDTH

(71) Applicant: Charter Communications Operating, LLC, St. Louis, MO (US)

(72) Inventors: John W. Williams, Aurora, CO (US); Esteban E. Sandino, Greenwood Village, CO (US); Diana P. Linton, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 319 days.

(21) Appl. No.: 18/087,778

(22) Filed: Dec. 22, 2022

(65) Prior Publication Data

US 2024/0214008 A1   Jun. 27, 2024

(51) Int. Cl.
*H04B 1/00* (2006.01)

(52) U.S. Cl.
CPC ......... *H04B 1/0075* (2013.01); *H04B 1/0057* (2013.01)

(58) Field of Classification Search
CPC .................... H04B 1/0075; H04B 1/0057
See application file for complete search history.

(56) References Cited

U.S. PATENT DOCUMENTS

| | | | | |
|---|---|---|---|---|
| 10,924,177 | B2 * | 2/2021 | Atkinson | H03F 3/24 |
| 2009/0310317 | A1 * | 12/2009 | Horten | H05K 9/0022 |
| | | | | 361/752 |
| 2016/0261901 | A1 * | 9/2016 | Petrovic | H04N 21/6168 |
| 2016/0308499 | A1 * | 10/2016 | Kosaka | H01L 23/66 |
| 2019/0320134 | A1 * | 10/2019 | Barany | H04N 7/17309 |
| 2020/0329282 | A1 * | 10/2020 | Mäki | H04B 1/12 |

(Continued)

FOREIGN PATENT DOCUMENTS

WO    WO-2021011134 A1 *  1/2021  .......... H04B 1/1027

*Primary Examiner* — Dhaval V Patel
(74) *Attorney, Agent, or Firm* — Straub & Straub; Michael P. Straub; Stephen T. Straub

(57) ABSTRACT

A radio frequency (RF) amplifier assembly includes modular amplification and processing units, which can be easily installed or replaced in the housing of the RF amplifier assembly, e.g., in response to changing needs and/or changing capabilities in the cable network communications system. The RF amplifier housing facilitates, e.g., via slots with connectors, accepting and coupling of alternative modular units, which can be installed/removed. The RF amplifier assembly includes a first spectrum (e.g., legacy spectrum) amplification and processing circuit, supporting both upstream and downstream signaling. The RF amplification assembly further includes one or more optional additional (extended) spectrum amplification and processing circuits, which are removeable modular units, and which support downstream signaling over extended spectrum. The RF amplifier assembly further includes spectrum splitter/combiner circuits, e.g., implemented in some embodiments using a diplexer-less design, for splitting/combining spectrum blocks with regard to multiple amplification and processing circuits installed within the RF amplifier assembly.

19 Claims, 17 Drawing Sheets

(56) References Cited

U.S. PATENT DOCUMENTS

2020/0336089 A1* 10/2020 Fanduzzi .............. H02P 29/027
2022/0368372 A1* 11/2022 Barany .................... H03F 3/62
2024/0097652 A1*  3/2024 Salvador ................. H03H 9/25

* cited by examiner

APPARATUS FOR SUPPORTING AMPLIFICATION AND PROCESSING OF RF SIGNALS CORRESPONDING TO A COMBINED SPECTRUM THAT INCLUDES LEGACY BANDWIDTH AND ADDITIONAL EXTENDED BANDWIDTH

FIELD

The present application relates to communications systems, e.g., CATV communications systems, and more particularly to new amplifier apparatus and methods for supporting legacy bandwidth and additional extended bandwidth.

BACKGROUND

Radio frequency devices, such as multicarrier broadband amplifiers, can provide for the transmission and processing of signals, such as cable television signals (CATV signals). New developments have expanded the operational spectrum of multicarrier broadband devices used for the transmission and processing of CATV signals from, for instance, about 5 MHz to about 1.8 GHz and possibly beyond 3 GHZ.

Conventional two-way broadband amplifiers provide RF gain to overcome cable RF losses and may implement fixed or switchable diplex filters, or other high-isolation RF devices such as a splitter/combiner, to enable transport of two way signals over the available RF spectrum. Fixed diplex filters have been conventionally used in CATV amplifiers to enable multiple upstream/downstream split frequency plans such as, for example, high-split where the 5-204 MHz range is allocated to upstream transmissions and the 258-1,218 MHz range is allocated to downstream transmissions. To prevent interference, fixed diplex filters use a guard band, an unused part of the radio spectrum between the upstream and downstream frequency bands. The guard band is also known as the cross-over band and is required to separate two wider frequency ranges to ensure that both can transmit simultaneously without interfering with each other. Cable architectures are expected to expand to utilize even higher ultra-high-split frequency plans that increase allocated upstream bandwidth as high as into the 5-684 MHz range. As the upstream spectrum expands, and increasingly wider guard bands are required to prevent interference, the downstream bandwidth is correspondingly reduced, which will further drive downstream spectrum expansions to about 3.0 GHz or higher.

Operators are looking to accommodate bandwidth expansions to increase upstream/downstream capacity without having to re-space or replace existing RF amplifier housings, which requires amplifiers capable of much higher RF output levels, and without compromising distortion performance. In addition, cross-over or guard band bandwidth penalties should be minimized. This demand for increased operational bandwidth is in turn driving the semiconductor industry to deliver devices with higher linear output powers to accommodate downstream spectrum expansions while preserving legacy RF amplifier spacing. Even though the new generation of GaN-based broadband gain blocks for CATV signal amplification has enabled the development of active devices such as power amplifiers with higher output power levels, there are still challenges. Additional AC power to support the new power amplifiers needed for spectrum expansions may increase, which may in turn drive expensive upgrades to the existing network power grids to supply the additional AC power. Moreover, current RF amplifier designs where the entirety of the RF operational downstream spectrum is processed and amplified as a single spectral block, and which force individual active devices to operate close to or beyond their Total Composite Power (TCP) limits, may either require housing upgrades to dissipate the increased heat or re-designed housings with improved thermal dissipation characteristics. The higher TCP may also increase levels of undesired noise and distortions beyond acceptable ranges, and seriously degrade performance. Cost is another factor since GaN substrates that operate over increasingly wider RF bandwidths remain difficult and expensive to produce. Lastly, cross-over/guard band requirements needed in traditional fixed diplex filter designs to safely separate multiple operating frequency bands and prevent cross-interference may prove to be too high a penalty to pay when expanding RF downstream spectrum.

Based on the above discussion there is a need for new apparatus and methods for RF amplifier assemblies which can accommodate legacy spectrum and one or more blocks of additional extended spectrum. It would be beneficial if at least some of these new design amplifier assemblies were able to use existing amplifier assembly housings.

SUMMARY

Figure 1:
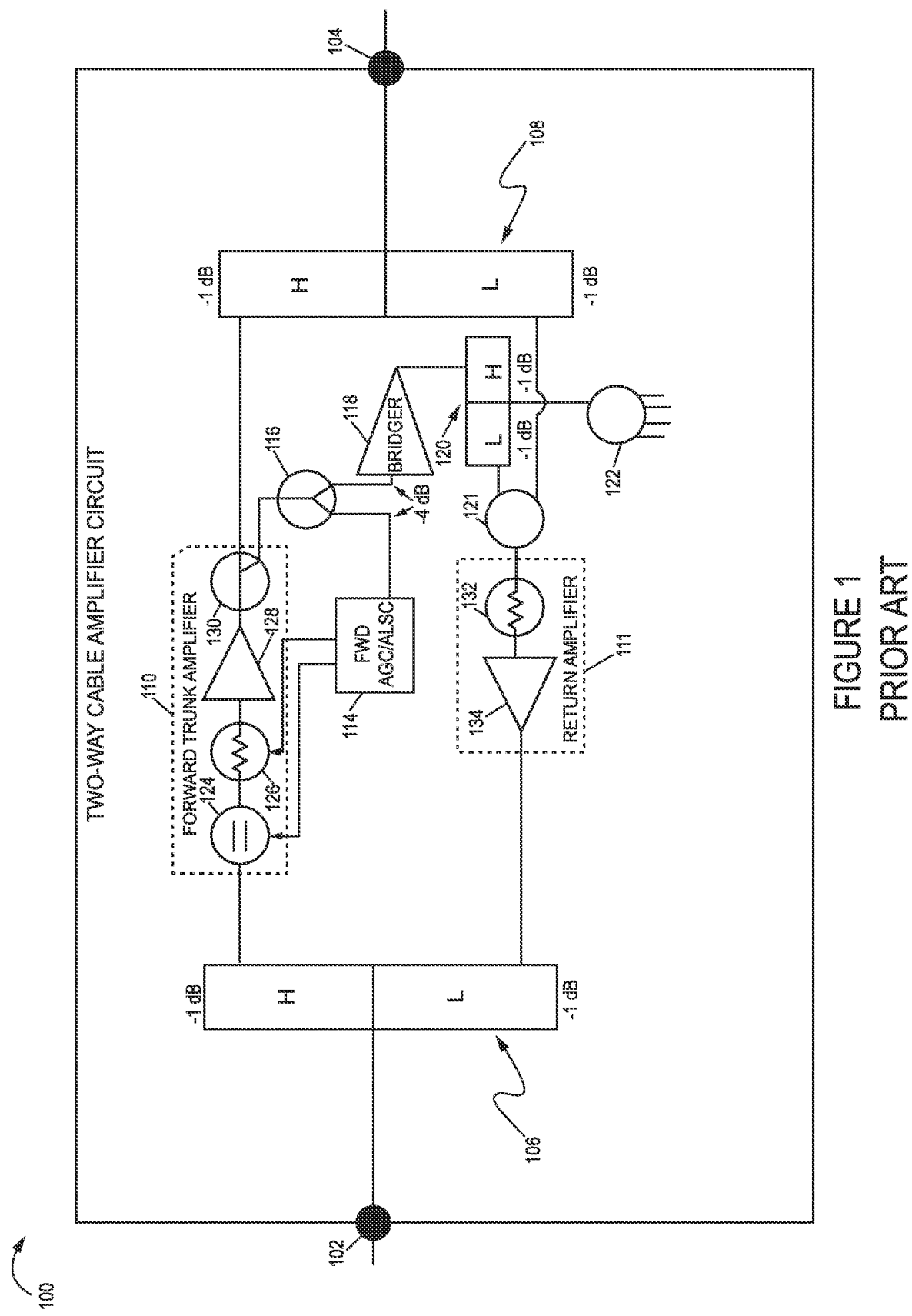
FIG. 1 is a drawing of a prior art two-way cable amplifier circuit.

A radio frequency (RF) amplifier assembly, in accordance with the present invention, includes at least some modular amplification and processing units, which can be easily installed or replaced in the housing of the RF amplifier assembly, e.g., in response to changing needs and/or changing capabilities in the cable network communications system or a portion, e.g., region, of the cable network communications system. The RF amplifier housing facilitates, e.g., via slots with connectors, accepting and coupling of alternative modular units, which can be installed/removed. The RF amplifier assembly includes a first spectrum (e.g., legacy spectrum) amplification and processing circuit, supporting both upstream and downstream signaling. The RF amplification assembly further includes one or more optional additional (extended) spectrum amplification and processing circuits, which are modular units, and which support downstream signaling over extended spectrum. The RF amplifier assembly further includes spectrum splitter/combiner circuits, e.g., implemented in some embodiments using a diplexer-less design, for splitting/combining spectrum blocks with regard to the multiple amplification and processing circuits installed within the RF amplifier assembly. In some embodiments, a pair of splitter combiner circuits are selected and matched to accommodate selected additional spectrum amplification and processing circuits which are to be installed and used in the RF amplifier assembly.

Options for the modular systems and RF amplifier architectures described herein are a departure from solutions that process and amplify signals as a single spectral RF block and are intended to expand the operational spectrum of legacy devices and systems while re-using existing legacy amplifier housings to avoid amplifier re-spacing, and also minimize overall AC power consumption, cost, RF guard band bandwidth penalties, and RF performance degradation.

An exemplary modular radio frequency (RF) amplifier assembly, in accordance with some embodiments, comprises: an amplifier housing: a first spectrum splitter/combiner circuit, mounted in said amplifier housing: a first amplification and processing circuit assembly mounted in said amplifier housing and being coupled to said first spectrum splitter/combiner circuit, said first amplification and processing circuit assembly being configured to amplify and pass signals in a first frequency band, said first frequency band including a first downstream frequency band and an upstream frequency band, said first frequency band being used for both upstream and downstream signals: a first additional amplification and processing circuit assembly, mounted in said amplifier housing and being coupled to said first spectrum splitter/combiner circuit, said first additional amplification and processing circuit assembly being configured to amplify and pass signals in a first additional frequency band, said first additional frequency band being an additional downstream frequency band, said first additional amplification and processing circuit assembly being implemented as an insertable module inserted into the amplifier housing and being electrically coupled to said first spectrum splitter/combiner circuit: and a second spectrum splitter/combiner circuit, mounted in said amplifier housing, said second spectrum splitter/combiner circuit being coupled to the first amplification and processing circuit assembly and said first additional amplification and processing circuit assembly.

While various features discussed in the summary are used in some embodiments, it should be appreciated that not all features are required or necessary for all embodiments and the mention of features on the summary should in no way be interpreted as implying that the feature is necessary or critical for all embodiments. Numerous additional features and embodiments are discussed in the detailed description which follows. Numerous additional benefits will be discussed in the detailed description which follows.

DETAILED DESCRIPTION

FIG. 1 is a drawing of a prior art two-way cable amplifier circuit 100. The two-way cable amplifier circuit 100 includes a first port 102, a second port 104, a first fixed diplex filter 106 with 1 dB insertion losses, a second diplex filter 108 with 1 dB insertion losses, a forward trunk amplifier circuit 110, a return amplifier circuit 111, forward (FWD) automatic gain control (AGC)/automatic level and slope control (ALSC) circuit 114, an RF signal splitter 116, bridger amplifier block 118, a third diplexer 120 with 1 dB insertion losses, a combiner 121 and a feedermaker 122 coupled together as shown. The forward trunk amplifier circuit 110 includes an equalizer 124, an attenuator 126, a forward amplifier 128 and RF directional coupler 130 coupled together as shown. The return amplifier circuit 111 includes attenuator 132 and amplifier 134. Port 102 serves as an input for forward RF spectrum signals and serves as an output for reverse RF spectrum signals. Port 104 serves as an output for forward RF spectrum signals and serves as an input of reverse RF spectrum signals. Forward RF spectrum signals are sometimes referred to as downstream RF spectrum signals. Reverse RF spectrum signals are sometimes referred to as upstream RF spectrum signals. The two-way cable amplifier circuit 100 of FIG. 1 shows an example of prior art illustrating RF processing and amplification of legacy forward and return paths, used for communicating signals over a bandwidth from about 5 MHz to about 1.2 GHZ. Fixed diplex filters, e.g., diplexers 106, 108, on the input and output of legacy amplifiers are used to separate and re-combine RF signals to enable separate and simultaneous processing and amplification of forward and return signals without both sets of signals interfering with each other.

Figure 2:
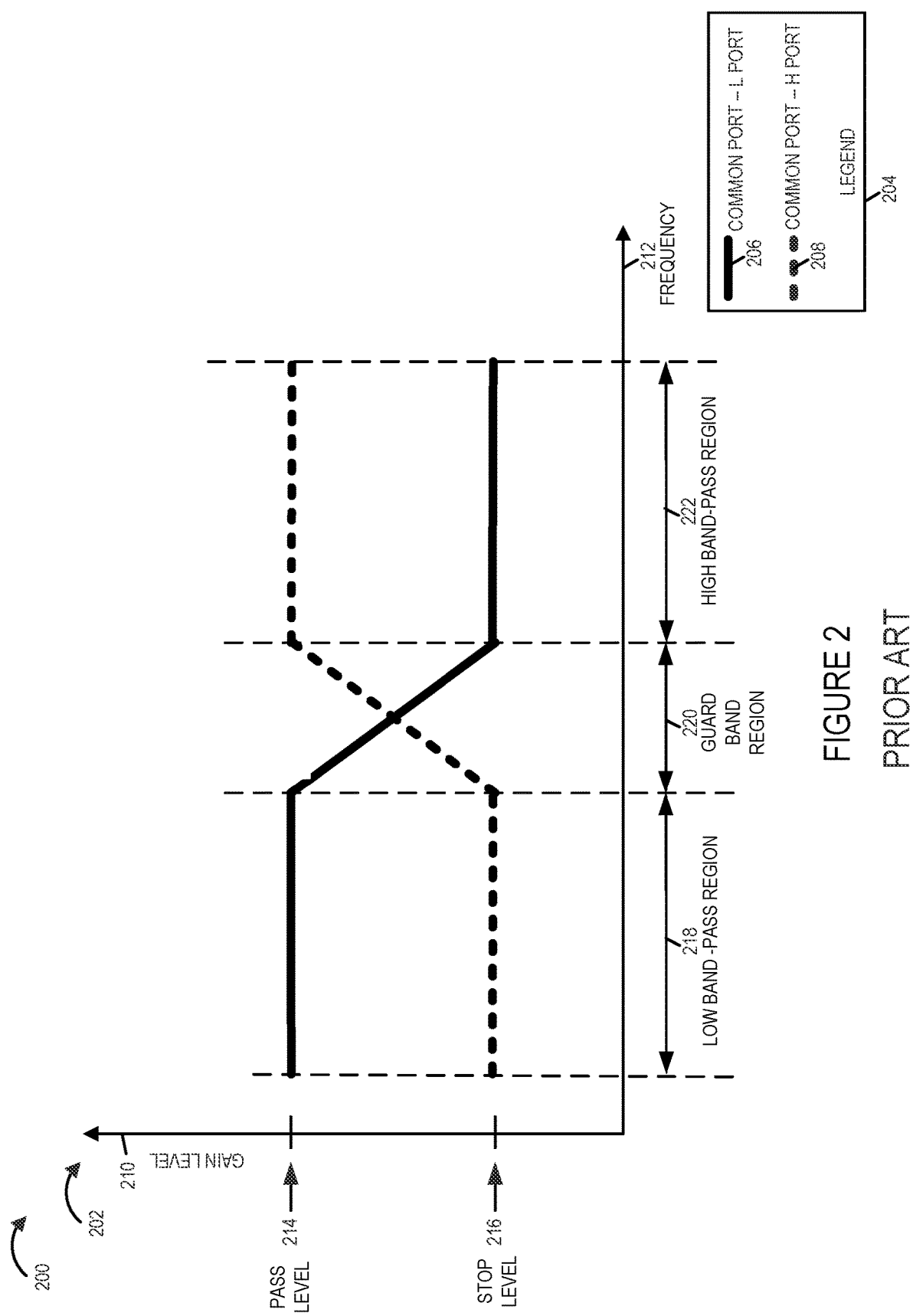
FIG. 2 is drawing illustrating a gain vs frequency plot for an example of a commonly used diplex filter implementation illustrating the guard band area necessary to isolate and prevent RF interference between high and low frequency signals.

FIG. 2 is drawing 200 illustrating a gain vs frequency plot 200 for an example of a commonly used diplex filter implementation illustrating the guard band area 220 necessary to isolate and prevent RF interference between high and low frequency signals. Vertical axis 210 represents gain level, while horizontal axis 212 represents frequency. Solid line 206 represents the characteristic curve for the low band path portion of the diplex filter (common port—L port), while dashed line 208 represents the characteristic curve of the high band pass filter portion of the diplex filter (common port—H port). Gain level 214 represents a pass level, and gain level 216 represents a stop level. In the low band pass region 218, the low band pass filter portion of the diplex filter passes signals, and the high band pass filter portion of the diplex filter stops signals. In the high band pass region 222, the high band pass filter portion of the diplex filter passes signals, and the low band pass filter portion of the diplex filter stops signals. In the guard band region 220, the gain of high band pass filter portion of the diplex filter increases as frequency increases, and the gain of the low band pass filter portion of the diplex filter decreases as the frequency increases.

Figure 3:
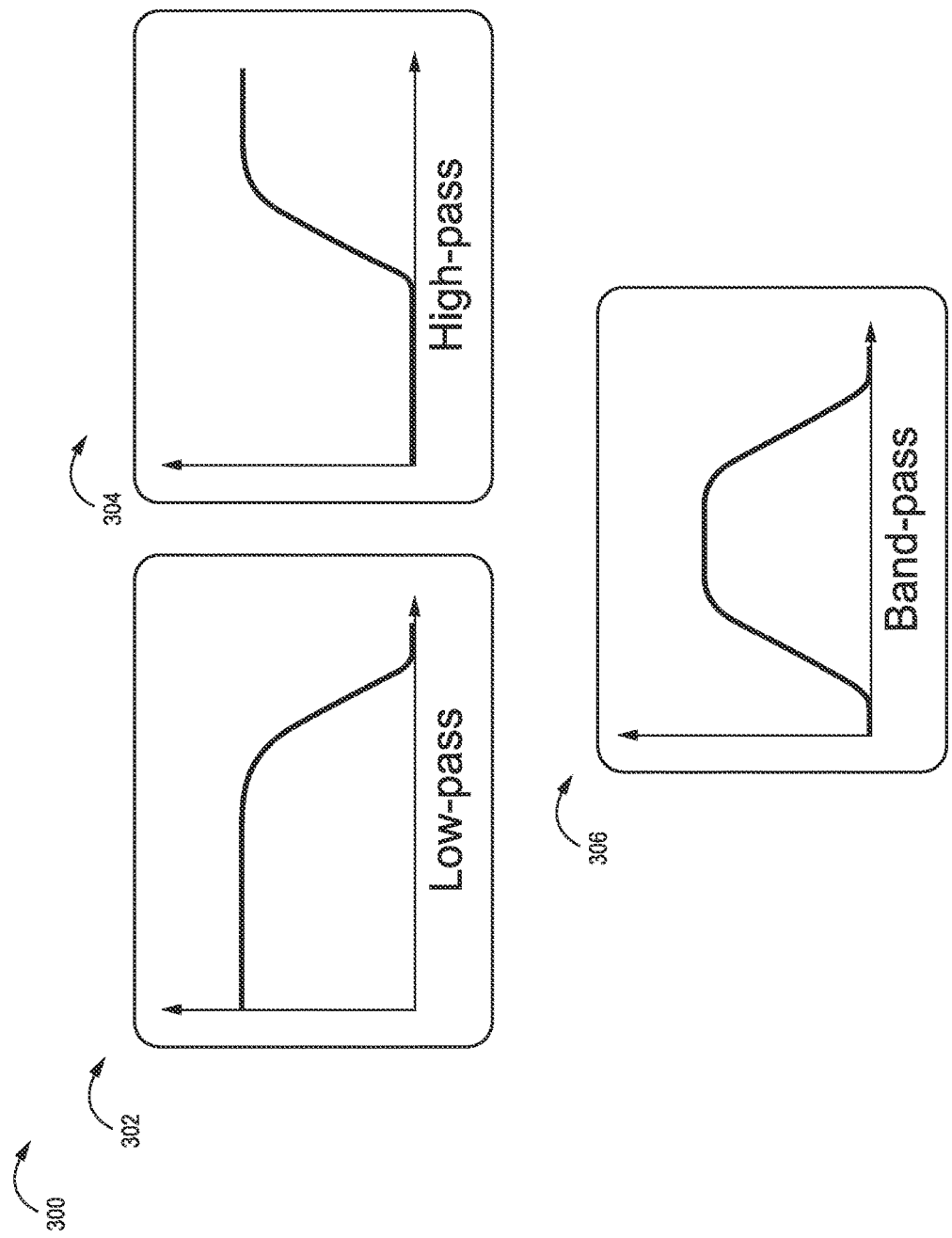
FIG. 3 is a drawing including gain vs frequency plots, illustrating frequency response characteristics of basic types of RF filters: low pass filters, high pass filters, and band-pass filters.

FIG. 3 is a drawing 300 including gain vs frequency plots 302, 304, 306, illustrating frequency response characteristics of basic types of RF filters (low pass filters, high pass filters, and band-pass filters), respectively.

Figure 4:
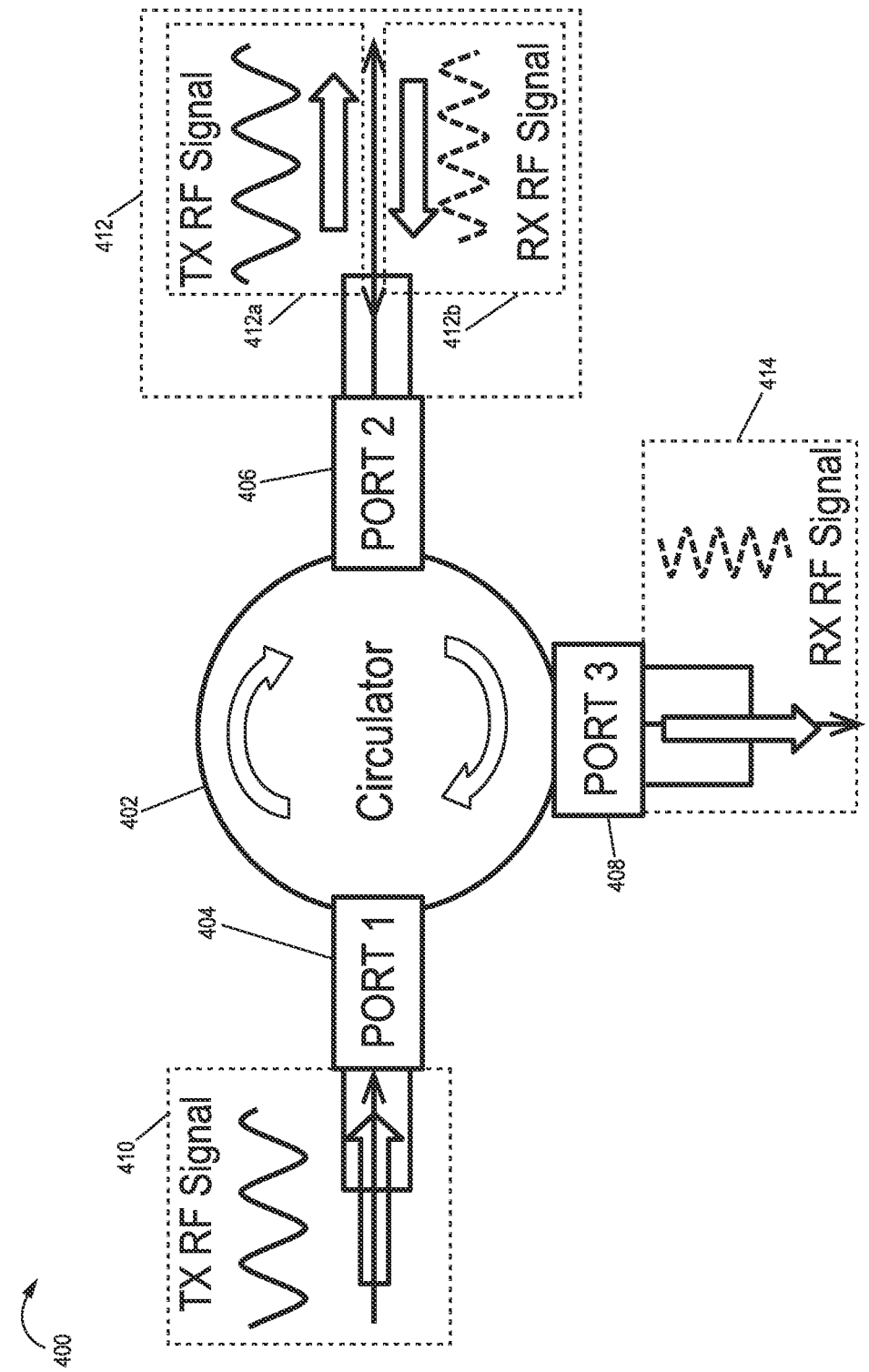
FIG. 4 is a prior art example of a schematic representation of RF circulator circuit including three ports.

FIG. 4 is a prior art example of a schematic representation of RF circulator circuit 402 including three ports (port 1 404, port 2 406, and port 3 408). Port 1 404 of RF circulator circuit 402 receives, as input TX RF signals 410. Port 3 408 of RF circulator circuit 402 sends, as output RX RF signals 414. Port 2 406 of RF circulator circuit 402 sends, as output RX RF signals 412a. Port 2 receives as input RX RF signals 412b. Signals 412 represents the combination of output signals 412a and input signals 412b. The RF circulator circuit 402 is used to optimize separation and recombining of RF signals while minimizing cross-over and guard band requirements.

Figure 5:
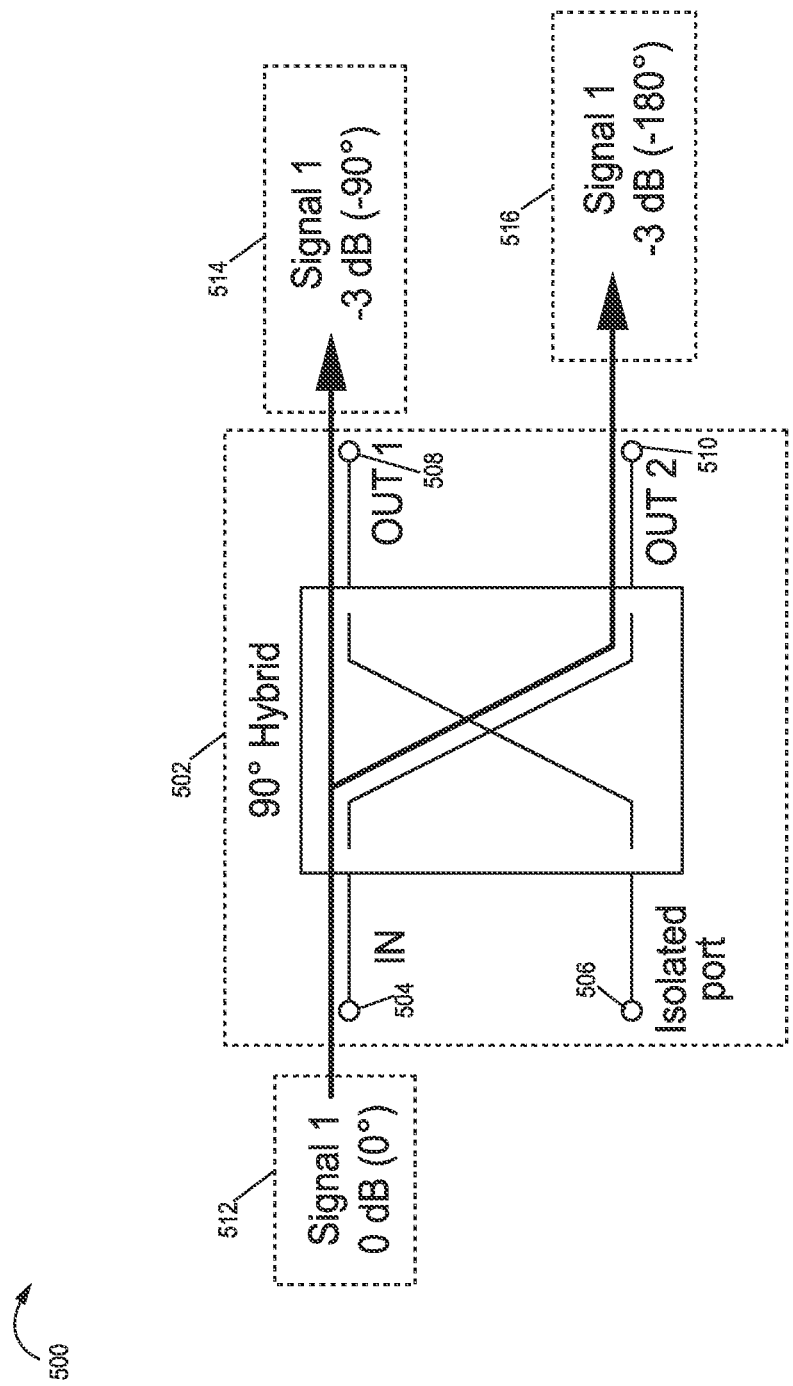
FIG. 5 is drawing of an example of a schematic representation of a prior art hybrid RF coupler which can be used to isolate and separate RF frequencies while minimizing RF signal insertion losses and cancelling out unwanted RF reflections.

FIG. 5 is drawing 500 of an example of a schematic representation of a prior art 90 degree hybrid RF coupler 502 which can be used to isolate and separate RF frequencies while minimizing RF signal insertion losses and cancelling out unwanted RF reflections. The 90 degree hybrid RF coupler 502 includes a input (IN) port 504, a first out port (OUT 1) 508, a second output port (OUT 2 510), and an isolated port 506. Input signal 1 512, received at input port 504, has a received power level attenuation of 0 dBs and 0 degrees phase shift, is processed by the RF coupler 502, and output: i) on the first output port (OUT 1 508) as a first output signal 514, which is the processed version of input signal 1 512 with a power level attenuation of 3 dB and a phase shift of −90 degrees with respect to input signal 1 512, and ii) on the second output port (OUT 2 510) as second output signal 516, which is the processed version of input signal 1 512 with a power level attenuation of 3 dB and a phase shift of −180 degrees with respect to input signal 1 512.

Figure 6:
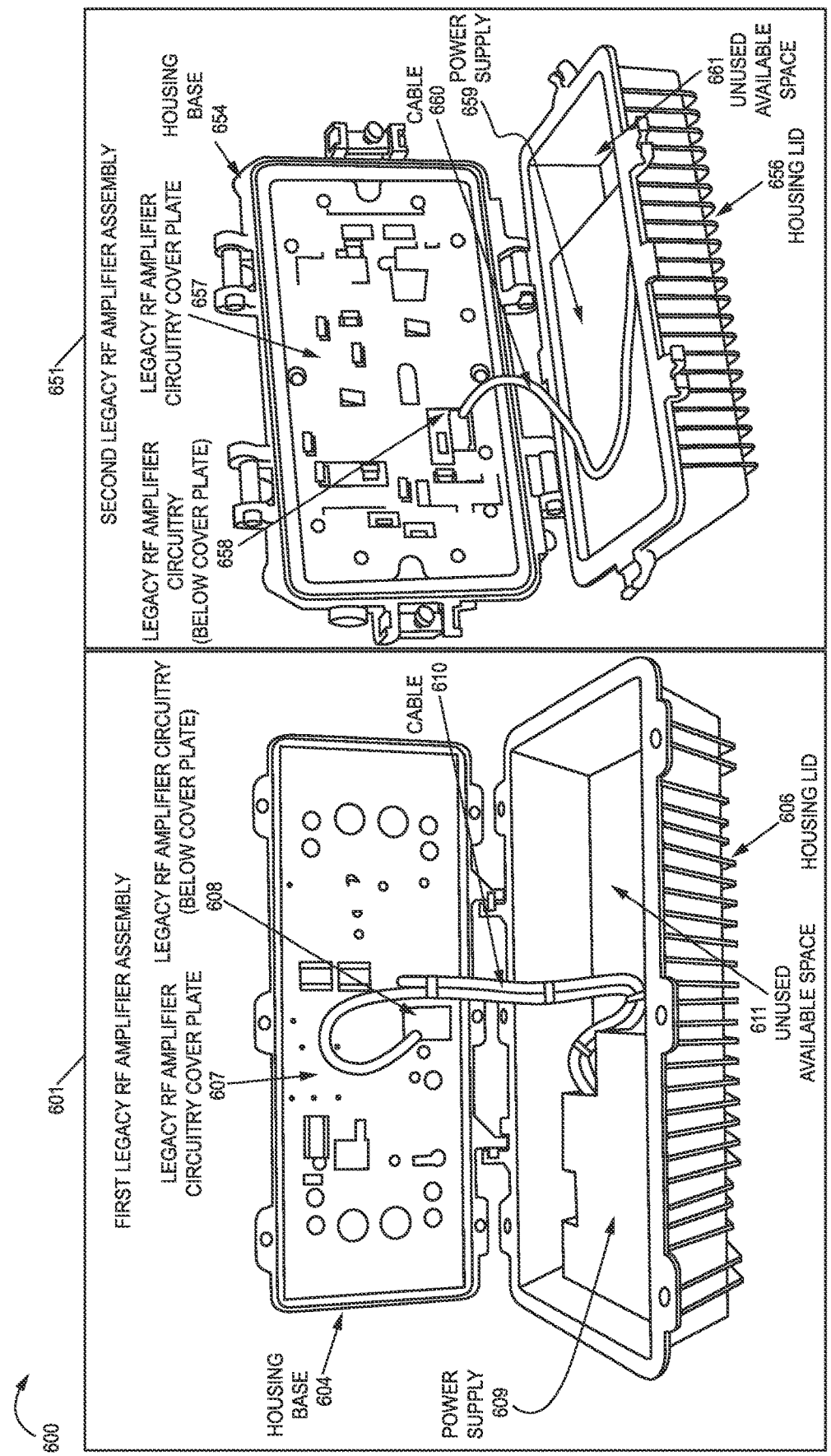
FIG. 6 is a drawing illustrating a first legacy RF amplifier assembly and a second legacy RF amplifier assembly, said first legacy RF amplifier assembly and said second legacy RF amplifier assembly being presently deployed in CATV distributions networks.

FIG. 6 is a drawing 600 including two legacy RF amplifier assemblies (601, 651), showing the cases in an open position, so that the internal components and layout may be viewed. The first legacy RF amplifier assembly and the second legacy RF amplifier assembly are presently deployed in CATV distributions networks. First legacy RF amplifier assembly 601 includes a housing base 604 and a housing lid 606. Legacy RF amplifier circuitry 608 is located, e.g., mounted, within base 604 and below legacy RF amplifier circuitry cover plate 607. Various test connectors, mounted on the cover plate 607, are also included to allow technical service access to various points within the RF amplifier circuit, e.g., to facilitate troubleshooting. Power supply 609 is located, e.g., mounted within lid 606. Cable 610 couples the legacy RF amplifier circuitry 608 to the power supply 609. It may be observed that there is unused space 611 available within lid 606.

Second legacy RF amplifier assembly 651 includes a housing base 654 and a housing lid 656. Legacy RF amplifier circuitry 658 is located, e.g., mounted, within base 654 and below legacy RF amplifier circuitry cover plate 657. Various test connectors are also included in base 654 to allow technical service access to various points within the RF amplifier circuit, e.g., to facilitate troubleshooting. Power supply 659 is located, e.g., mounted within lid 656. Cable 660 couples the legacy RF amplifier circuitry 658 to the power supply 659. It may be observed that there is unused space 661 available within lid 656.

Figure 7:
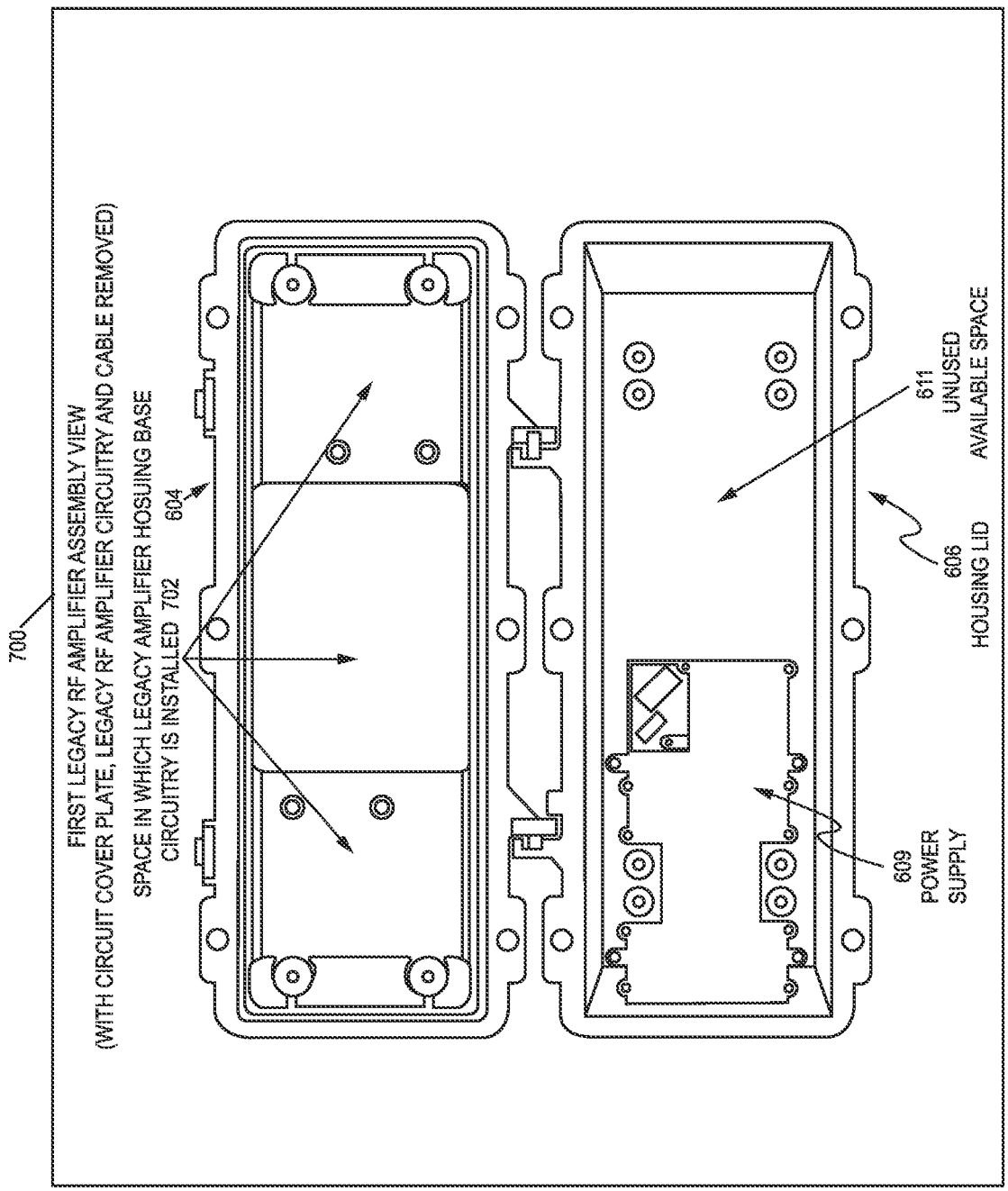
FIG. 7 is a drawing illustrating the first legacy RF amplifier assembly of FIG. 6, with the legacy RF amplifier circuitry cover plate, legacy amplifier circuitry and the connecting cable having been removed, showing the area in the housing base in which the legacy amplifier circuitry is installed, showing the power supply mounted in the cover, and showing available unused space within the housing cover.

FIG. 7 is a drawing 700 which illustrates a view of the first legacy RF amplifier assembly 601, with the cover plate 607, legacy RF amplifier circuitry 608, and cable 610 having been removed, to illustrate the physical space that is available inside a legacy RF amplifier housing. Drawing 700 shows area 702 in the housing base 604, in which the legacy RF amplifier circuitry 608 is installed. A portion of area 702 is used to accommodate the legacy RF amplifier circuit 608, and a portion of the area 702 is unused and available for expansion. The power supply 609 is mounted in the housing lid 604. It may be observed that there is unused space 611 available within lid 606, which is available for expansion.

Figure 8:
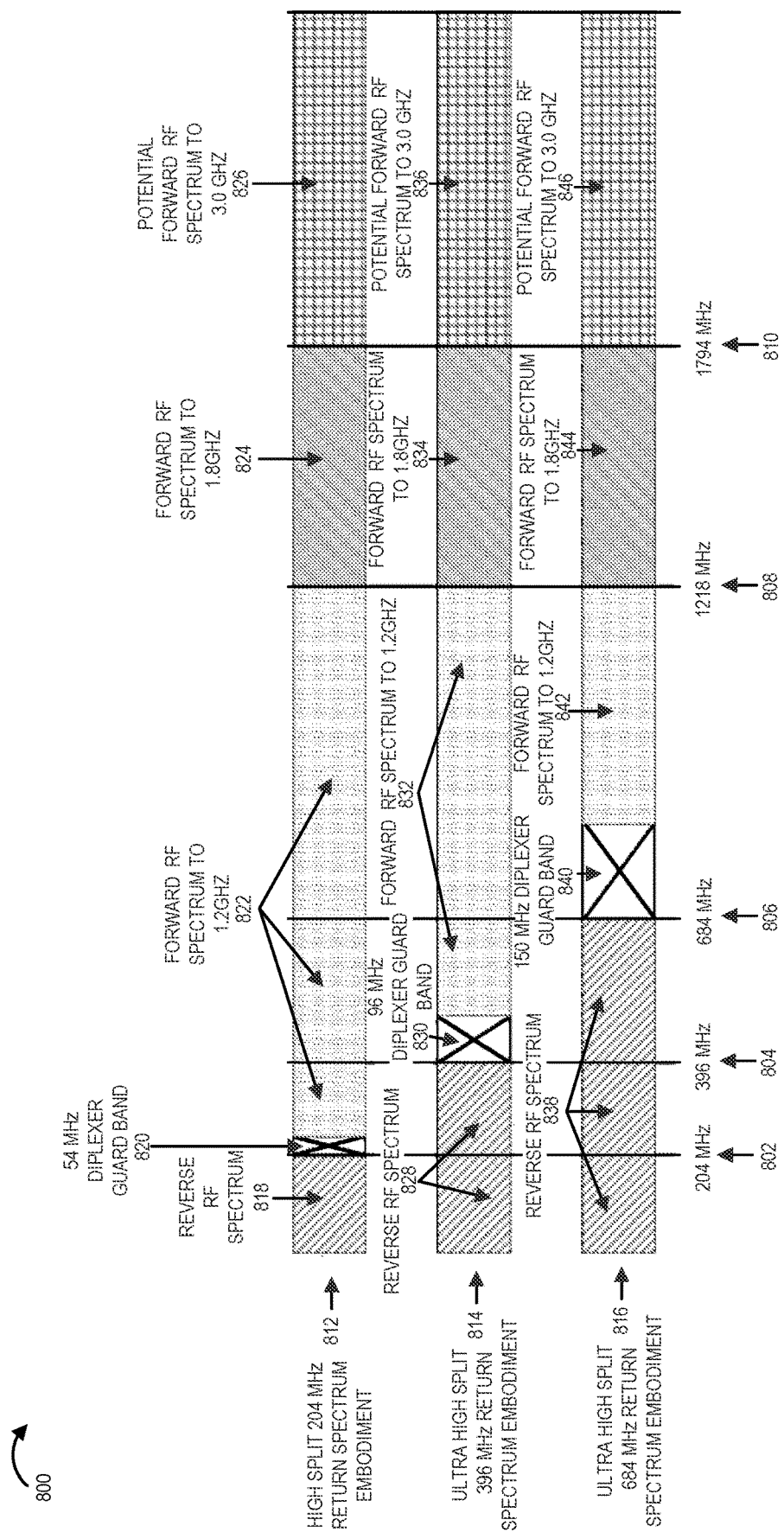
FIG. 8 illustrates examples of possible bandwidth allocations that can be implemented, e.g., in a CATV distribution network, in accordance with exemplary embodiments, to enable transport of two-way signals over available RF spectrum.

In some embodiments, in accordance with the present invention, a modular RF amplifier methodology is provided to separate the operational spectrum of a multicarrier broadband network into multiple frequency bands which includes generation of a partial spectrum signal from about 5 MHz to about 1.2 GHZ. This partial operational spectrum can be variously identified as legacy spectrum, legacy frequency block, and lower frequency block among other terms. Furthermore, additional frequency bands derived from the input operational spectrum can be further generated. For example, as illustrated in FIG. 8, a second frequency band comprising the partial spectrum from about 1.2 GHZ to about 1.8 GHz, or a third frequency band comprising the spectrum from about 1.8 GHZ to about 3.0 GHz, or possibly any combination of frequency bands comprising selected spectral blocks starting from about 1.2 GHz to about any other selected upper frequency up to 3.0 GHZ, can also be generated. These additional spectral blocks starting from about 1.2 GHz can also be variously identified as extended spectra, extended frequency blocks, overlay spectra, and upper spectra among other terms. Following the separation of the operational spectrum into two or more spectral blocks or frequency bands, the proposed modular RF amplifier architecture encompasses and leverages use of multiple RF modules that can be, and in some embodiments are, added to legacy amplifier housings as needed to process and amplify each of the two or more RF frequency bands or spectral blocks separately. Furthermore, the proposed modular RF amplifier architecture allows for the implementation of parallel amplification stages to process each RF spectral block separately. Following RF amplification, this methodology provides for the RF re-combining of the separate RF blocks to regenerate the full original operational spectrum from about 5 MHz up to about 3.0 GHz or possibly higher frequencies.

The modular RF amplifier architecture, in accordance with various exemplary embodiments of the present invention, provides flexibility and backward compatibility with legacy housings which is critical to operators. The legacy frequency block from 5 MHz to about 1.2 GHz may, and sometimes does, include RF diplexers and legacy RF amplification technology as implemented in prior art to continue the RF amplification of legacy forward and return RF spectrum, while preserving implementation of various RF downstream/upstream split options as described under current terminology such as sub-split, mid-split, high-split, and ultra-high-split and partially illustrated in FIG. 8.

FIG. 8 illustrates examples of possible bandwidth allocations that can be implemented, e.g., in a CATV distribution network, in accordance with exemplary embodiments, to enable transport of two-way signals over available RF spectrum. In the example, a high-split 204 MHz return spectrum implementation 812 using appropriate fixed diplex filters will require 54 MHZ of guard band 820 to separate the return spectrum 818 from a forward spectrum 822 starting at about 258 MHZ. Similarly, an ultra-high-split 396 MHZ return spectrum implementation 814 using appropriate fixed diplex filters will require 96 MHz of guard band 830 to separate the return spectrum 828 from a forward spectrum 832 starting at about 492 MHZ. Lastly, an ultra-high-split 684 MHz return spectrum embodiment 816 using appropriate fixed diplex filters will require approximately 150 MHz of guard band 840) to separate the return spectrum 838 from a forward spectrum 842 starting at about 834 MHz. Each return spectrum expansion requires incrementally higher bandwidth allocations to the forward downstream spectrum.

Drawing 800 illustrates an exemplary high split 204 MHZ return spectrum embodiment 812, an exemplary ultra high split 396 MHZ return spectrum embodiment, and an exemplary ultra high split 684 MHZ return spectrum embodiment.

The exemplary high split 204 MHZ embodiment 812 will now be described. The legacy spectrum block runs from about 5 MHz to approximately 1.2 GHZ. In the high split 204 MHZ return spectrum embodiment 812, the reverse RF spectrum (spectrum block 818), which is a sub-band of the legacy spectrum band, is spectrum up to 204 MHZ (802). Next there is a 54 MHz diplexer guard band 820, and then there is a block of forward RF spectrum to 1.2 GHZ (spectrum block 822), which is another sub-band of the legacy spectrum band, which ends at 1218 MHZ (808). Next there is first additional forward RF spectrum to 1.8 GHZ (spectrum block 824), which is from 1218 MHz (808) to 1794 MHZ (810). Next there is second additional (potential) forward RF spectrum to 3.0 GHz (spectrum block 826), which is from 1794 MHZ (810) to 3.0 GHZ.

The exemplary ultra high split 396 MHz embodiment 814 will now be described. The legacy spectrum block runs from about 5 MHz to approximately 1.2 GHZ. In the ultra high split 396 MHz return spectrum embodiment 814, the reverse RF spectrum (spectrum block 828), which is a sub-band of the legacy spectrum band, is spectrum up to 396 MHz (804). Next there is a 96 MHz diplexer guard band 830, and then there is a block of forward RF spectrum to 1.2 GHZ (spectrum block 832), which is another sub-band of the legacy spectrum band, which ends at 1218 MHZ (808). Next there is first additional forward RF spectrum to 1.8 GHZ (spectrum block 834), which is from 1218 MHz (808) to 1794 MHZ (810). Next there is second additional (potential) forward RF spectrum to 3.0 GHz (spectrum block 836), which is from 1794 MHZ (810) to 3.0 GHZ.

The exemplary ultra high split 684 MHz embodiment 816 will now be described. The legacy spectrum block runs from about 5 MHZ to approximately 1.2 GHZ. In the ultra high split 684 MHZ return spectrum embodiment 816, the reverse RF spectrum (spectrum block 838), which is a sub-band of the legacy spectrum band, is spectrum up to 684 MHz (806). Next there is a 150 MHz diplexer guard band 840, and then there is a block of forward RF spectrum to 1.2 GHZ (spectrum block 842), which is another sub-band of the legacy spectrum band, which ends at 1218 MHz (808). Next there is first additional forward RF spectrum to 1.8 GHZ (spectrum block 844), which is from 1218 MHz (808) to 1794 MHZ (810). Next there is second additional (potential) forward RF spectrum to 3.0 GHZ (spectrum block 846), which is from 1794 MHZ (810) to 3.0 GHZ.

Another variation of this RF amplifier architecture may integrate a diplexer-less approach as implemented in prior art to continue the RF amplification of legacy forward and return RF spectrum, while implementing various RF downstream/upstream split options without the need of a guard or cross over band between downstream and upstream signals.

Figure 9:
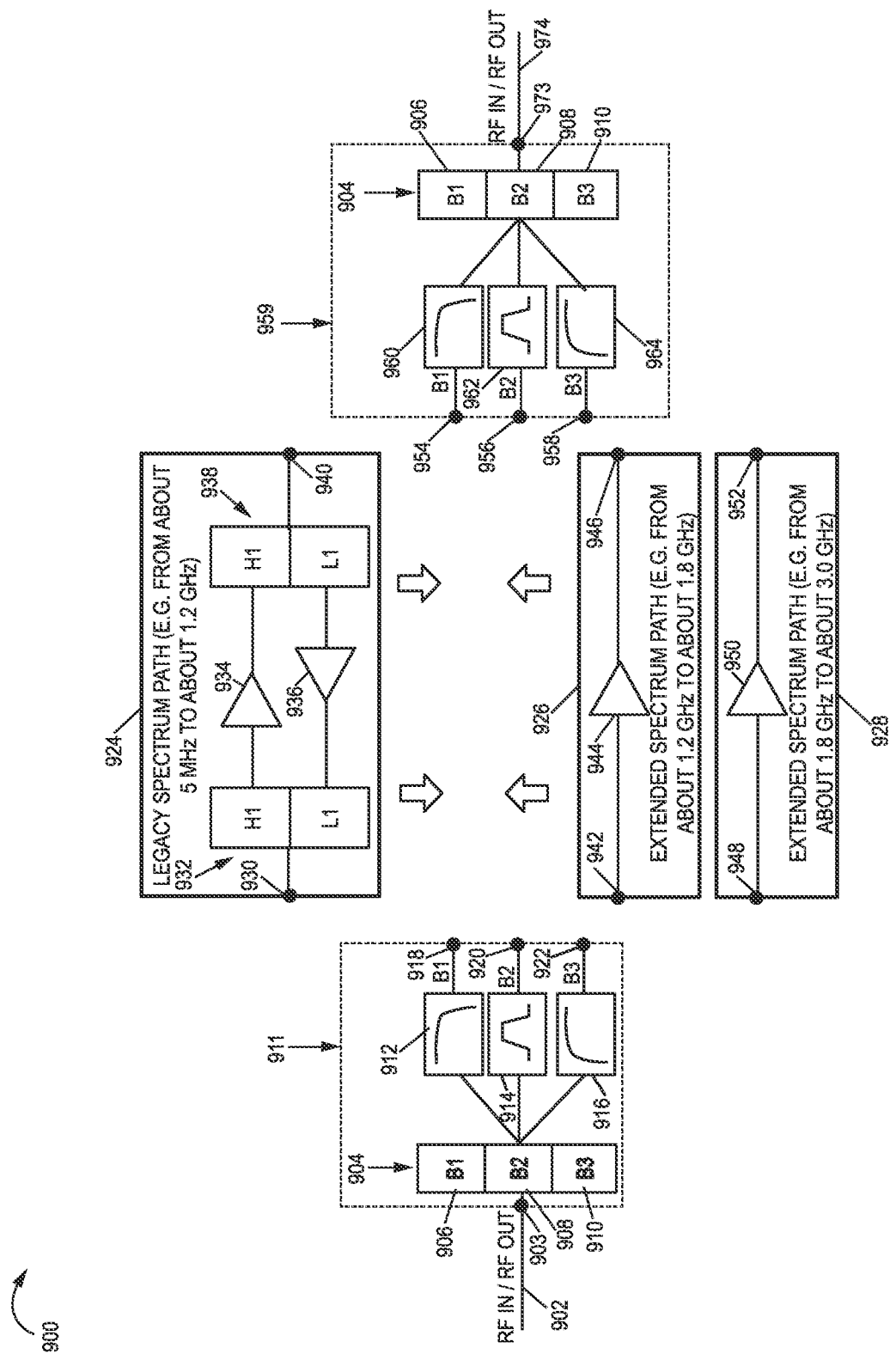
FIG. 9 is an example schematic of an exemplary embodiment, in accordance with the present invention, illustrating a modular RF amplifier architecture, to process and amplify frequencies including a legacy frequency band and one or more additional frequency bands.

FIG. 9 is an example schematic 900 of an exemplary embodiment, in accordance with the present invention, illustrating a modular RF amplifier architecture, to process and amplify frequencies including a legacy frequency band and one or more additional frequency bands. In some embodiments, the modular architecture supports amplification and processing for both a legacy frequency band and one or more additional frequency bands in a legacy amplifier housing, e.g., which was previously used for only amplification and processing of the signals corresponding to the legacy frequency band. The legacy frequency band, e.g., from about 5 MHz to about 1.2 GHZ, includes both legacy forward RF spectrum, sometimes referred to as downstream signaling spectrum, and legacy return (reverse) RF spectrum, sometimes referred to as upstream signaling spectrum.

Schematic 900, representing exemplary modular architecture, includes a first port 902 for receiving RF input signals and outputting RF signals, a filtering module 911 for splitting/combining spectrum, a legacy spectrum amplification and processing path module 924 for amplifying and processing both forward path RF signaling (downstream RF signaling) and reverse path RF signaling (upstream RF signaling) corresponding to a legacy frequency band (e.g., from about 5 MHz to about 1.2 GHZ), a first extended spectrum amplification and processing path module 926 for amplifying and processing forward path RF signaling (downstream RF signaling) corresponding to a first additional frequency band (e.g., from about 1.2 GHz to about 1.8 GHZ), and a second extended spectrum amplification and processing path module 928 for amplifying and processing forward path RF signaling (downstream RF signaling) corresponding to a second additional frequency band (e.g., from about 1.8 GHz to about 3.0 GHZ). Schematic 900 further includes a filtering module 959 for splitting/combining spectrum, and a second port 974 for receiving RF signals and outputting RF signals.

The legacy downstream RF spectrum can be, and sometimes is, in accordance with a feature of some embodiments of the present invention, expanded through the addition of RF frequency amplification and processing blocks, e.g., blocks 926 and/or 928, operating in parallel and within the same legacy housing. In some embodiments, the RF frequency amplification and processing module 924 amplifies signals corresponding to the frequency block B1 906. In some embodiments, a first additional RF frequency amplification and processing module 926 amplifies the signals corresponding to frequency block B2 908 from about 1.2 GHz to about 1.8 GHZ. In some such embodiments, a second additional RF frequency amplification and processing module 928 amplifies the signals corresponding to frequency block B3 910 from about 1.8 GHZ to about 3.0 GHZ.

Port 902 receives and outputs RF signals corresponding to combined spectrum 904 including a first band B1 906, a second band B2 908 and a third band B3 910. Port 902 is coupled to port 903 of filtering module 911. Filtering module 911 includes a low pass filter 912 for passing first band B1 906 RF signals between port 903 and port 918. Filtering module 911 includes a band pass filter 914 for passing second band B2 908 RF signals between port 903 and port 920. Filtering module 911 includes a high pass filter 916 for passing third band B3 910 RF signals between port 903 and port 922.

Port 974 receives and outputs RF signals corresponding to combined spectrum 904 including a first band B1 906, a second band B2 908 and a third band B3 910. Port 974 is coupled to port 973 of filtering module 959. Filtering module 959 includes a low pass filter 960 for passing first band B1 906 RF signals between port 954 and port 973. Filtering module 959 includes a band pass filter 962 for passing second band B2 908 RF signals between port 956 and port 973. Filtering module 959 includes a high pass filter 964 for passing third band B3 910 RF signals between port 958 and port 973.

Legacy spectrum amplification and processing module 924 includes a first port 930, a diplexer 932, a forward path amplifier 934, a reverse path amplifier 936, a diplexer 938 and a second port 940 coupled together as shown. Diplexer 932 passes signals in a higher bandwidth portion (H1) of band B1 906 between port 930 and the input of forward path amplifier 934. Diplexer 938 passes signals in the higher bandwidth portion (H1) of band B1 906 between the output of forward path amplifier 934 and port 940. Diplexer 938 passes signals in the lower bandwidth portion (LI) of band B1 906 between port 940 and the input of reverse path amplifier 936. Diplexer 932 passes signals in the lower bandwidth portion (LI) of band B1 906 between the output of reverse path amplifier 936 and port 930.

First extended spectrum amplification and processing module 926 includes an input port 942, a forward path amplifier 944 and an output port 946 coupled together as shown. Second extended spectrum amplification and processing module 928 includes an input port 948, a forward path amplifier 950 and an output port 952 coupled together as shown.

In some exemplary embodiments, port 918 of filtering module 911 is connected to port 930 of legacy spectrum amplification and processing module 924, and port 940 of legacy spectrum amplification and processing module 924 is connected to port 954 of filtering module 959. In some such embodiments, port 920 of filtering module 911 is connected to input 942 of first extended spectrum amplification and processing module 926, and output 946 of first extended spectrum amplification and processing module 926 is connected to port 956 of filtering module 959. In some such embodiments, port 922 of filtering module 911 is connected to input 948 of second extended spectrum amplification and processing module 928, and output 952 of second extended spectrum amplification and processing module 928 is connected to port 958 of filtering module 959.

Figure 10:
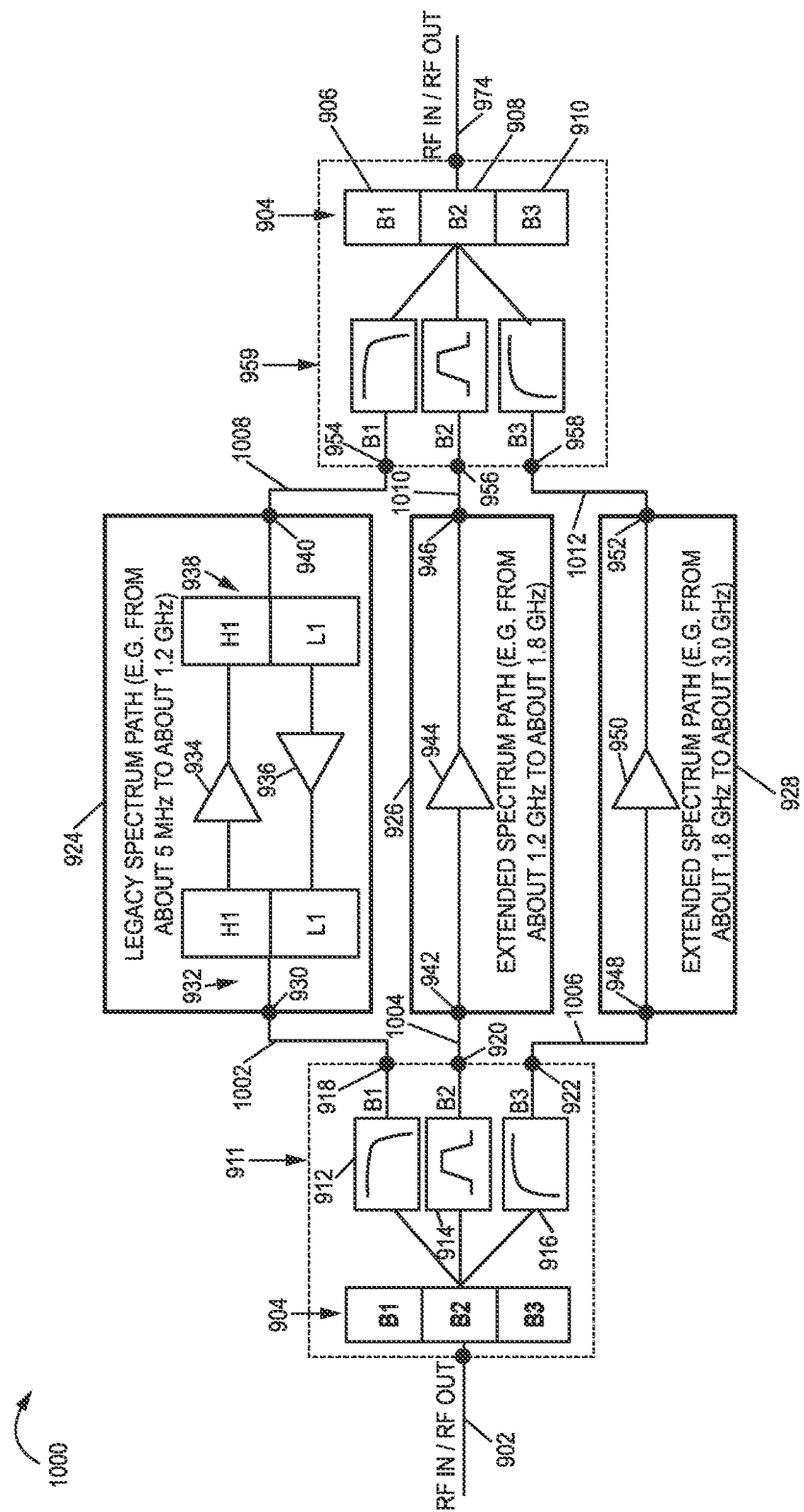
FIG. 10 includes a drawing which illustrates the schematic modules (filtering module, legacy spectrum amplification and processing module, first extended spectrum amplification and processing module, second extended spectrum amplification and processing module, and filtering module) of FIG. 9 coupled together.

FIG. 10 includes drawing 1000, which illustrates the schematic modules (filtering module 911, legacy spectrum amplification and processing module 924, first extended spectrum amplification and processing module 926, second extended spectrum amplification and processing module 928, and filtering module 959) of FIG. 9 coupled together as described above. Port 918 of filtering module 911 is connected via communications link 1002 to port 930 of legacy spectrum amplification and processing module 924, and port 940 of legacy spectrum amplification and processing module 924 is connected via communications link 1008 to port 954 of filtering module 959. Port 920 of filtering module 911 is connected via communications link 1004 to input 942 of first extended spectrum amplification and processing module 926, and output 946 of first extended spectrum amplification and processing module 926 is connected via communications link 1010 to port 956 of filtering module 959. Port 922 of filtering module 911 is connected to input 948 of second extended spectrum amplification and processing module 928, and output 952 of second extended spectrum amplification and processing module 928 is connected via communications link 1012 to port 958 of filtering module 959.

FIG. 10 illustrates the modular RF amplifier architecture approach in one embodiment where the incoming RF operational spectrum 904 is split into multiple frequency bands (B1 906, B2 908, B3 910) which feed into corresponding parallel processing blocks (924, 926, 928) within the same amplifier housing, e.g., the same legacy amplifier housing. Each spectral band is processed in parallel, and the output of each RF module or legacy-style RF tray is subsequently brought back together and combined to re-create the full original RF operational spectrum.

Using a modular RF amplifier architecture, the expanded spectral blocks starting from about 1.2 GHz can be amplified separately, without requiring additional RF diplexers. As a result, the extended frequency block(s) starting from about 1.2 GHZ, in some embodiments, will only be used to expand downstream RF spectrum. Post-amplification, each of the RF blocks are re-combined to generate the full operational spectrum from about 5 MHz up to about 3.0 GHz or higher frequencies. This allows for a reduction or even elimination of the requirement for a cross-over region or guard band between extended frequency block(s) through the implementation of different methodologies such as a combination of RF filters, RF couplers, RF circulators or other high isolation passive coupler configurations. Furthermore, the RF processing and amplification of two or more RF spectral blocks in parallel paths will allow for the use of RF power amplifiers with a reduced bandwidth of operation for each parallel path that enables a reduction in required AC power, and a reduction in operating total composite power (TCP) required for each RF spectral block, which also leads to reduced thermal dissipation requirements and reduced distortions.

Figure 11:
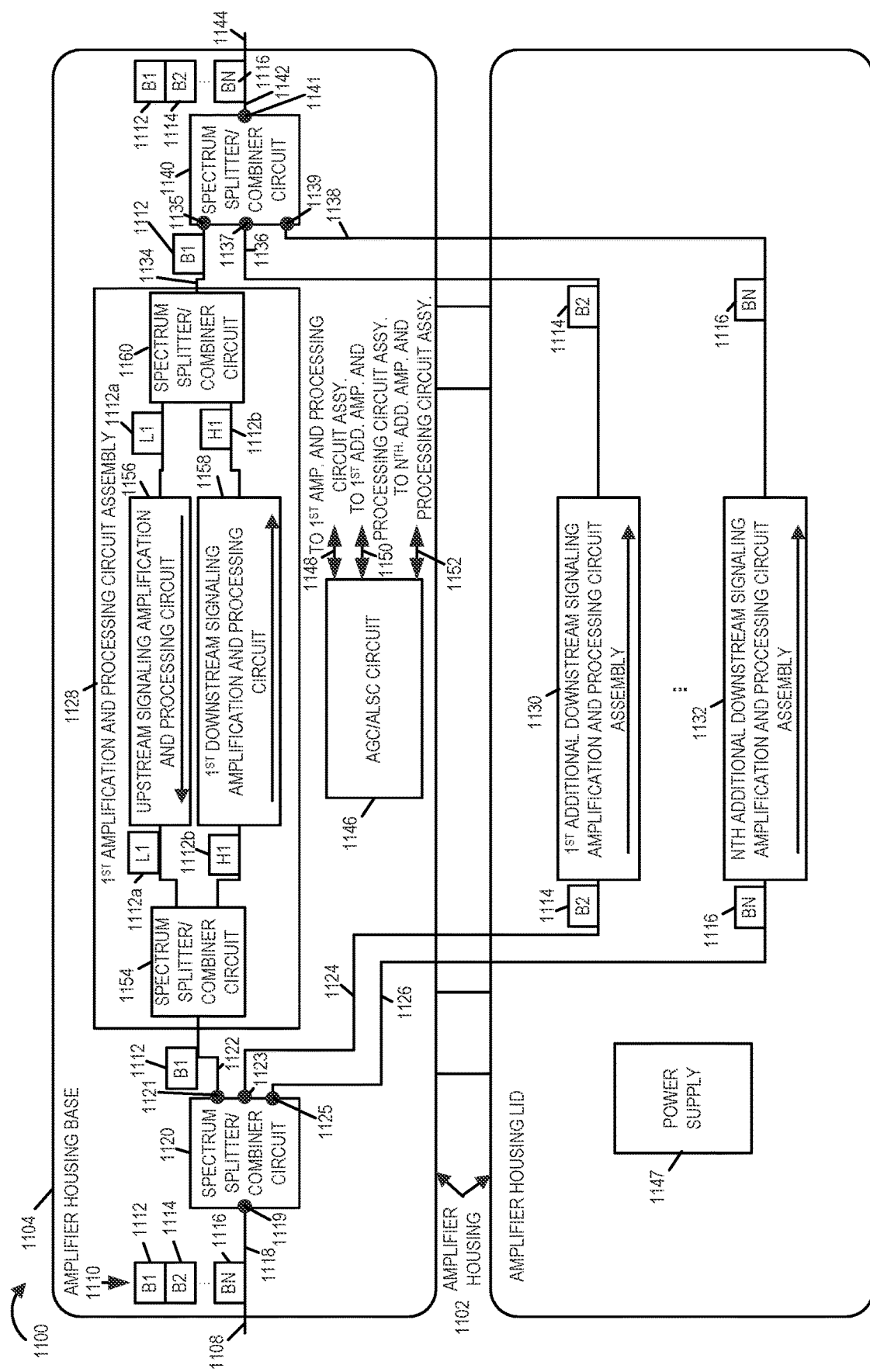
FIG. 11 is a drawing of an exemplary modular radio frequency (RF) amplifier assembly in accordance with an exemplary embodiment.

FIG. 11 is a drawing of an exemplary modular radio frequency (RF) amplifier assembly 1100 in accordance with an exemplary embodiment. Modular RF amplifier assembly 1100 may be used in a CATV network. Modular RF amplifier assembly 1100 includes an amplifier housing 1102 including an amplifier housing base 1104 and an amplifier housing lid 1106. The modular RF amplifier assembly 1100 includes, mounted within amplifier housing base 1104, a first port 1108, a spectrum splitter/combiner circuit 1120, a 1st amplification and processing circuit assembly 1128, a spectrum splitter/combiner circuit 1140, a second port 1144, and an automatic gain control (AGC)/automatic level and slope control (ALSC) circuit 1146. Spectrum splitter/combiner circuit 1120 includes a combined spectrum port 1119 (corresponding to the combination of spectrum blocks (B1, B2, . . . BN), sometimes referred to as a common port, and a plurality of individual spectrum block ports (individual spectrum block port 1121 (corresponding to spectrum block B1), individual spectrum block port 1123 (corresponding to spectrum block B2), . . . , individual spectrum block port 1127 (corresponding to spectrum block BN)). Spectrum splitter/combiner circuit 1140 includes a plurality of individual spectrum block ports (individual spectrum block port 1135 (corresponding to spectrum block B1), individual spectrum block port 1137 (corresponding to spectrum block B2), . . . , individual spectrum block port 1139 (corresponding to spectrum block BN)), and a combined spectrum port 1141 (corresponding to the combination of spectrum blocks (B1, B2, . . . BN), sometimes referred to as a common port.

The modular RF amplifier assembly 1100 further includes, mounted within the amplifier housing lid 1106, a power supply 1147 and one or more additional downstream signaling amplification and processing circuit assemblies (1st additional downstream signaling amplification and processing circuit assembly 1130, . . . , Nth additional downstream signaling amplification and processing circuit assembly 1132). In one exemplary embodiment, the spectrum splitter/combiner circuit 1120 is filtering module 911 of FIGS. 9 and 10, the 1st amplification and processing circuit assembly 1128 is the legacy spectrum path RF amplification and processing module 924 of FIGS. 9 and 10, the 1st additional downstream signaling amplification and processing circuit assembly 1130 is extended spectrum amplification and processing module 926 of FIGS. 9 and 10, the 2nd additional downstream signaling amplification and processing circuit assembly 1132 is extended spectrum amplification and processing module 928 of FIGS. 9 and 10, and the spectrum splitter/combiner circuit 1140 is filtering module 959 of FIGS. 9 and 10.

Port 1108 is coupled, via communications link 1118, to a common port 1119 of spectrum splitter/combiner circuit 1120. In some embodiments, the common port 1119 of the spectrum splitter/combiner circuit 1120 is port 1108. Port 1108 receives, as input, downstream (forward) RF spectrum signals. Port 1108 outputs upstream (reverse) RF spectrum signals. Communications link 1118 carries combined spectrum signals including spectrum block B1 1112 signals, spectrum block B2 1114 signals, and spectrum block BN 1116 signals. Individual spectrum block port 1121 of spectrum splitter/combiner circuit 1120 is coupled to 1st amplification and processing circuit assembly 1128 via communications link 1120 over which spectrum block B1 1112 signals are communicated. Individual spectrum block port 1123 of spectrum splitter/combiner circuit 1120 is coupled to 1st additional downstream signaling amplification and processing circuit assembly 1130 via communications link 1124 over which spectrum block B2 1114 downstream signals are communicated. Individual spectrum block port 1125 of spectrum splitter/combiner circuit 1120 is coupled to Nth additional downstream signaling amplification and processing circuit assembly 1132 via communications link 1126 over which spectrum block BN 1116 downstream signals are communicated.

1st amplification and processing circuit assembly 1128 includes spectrum splitter/combiner circuit 1154, upstream signaling amplification and processing circuit 1156, 1st downstream signaling amplification and processing circuit 1158, and spectrum splitter/combiner circuit 1160. Spectrum splitter/combiner circuit 1154 communicates (receives and outputs) spectrum block B1 1112 signals via communications link 1120. Spectrum splitter/combiner circuit 1154 receives lower block B1 spectrum (LI) signals, which are output from upstream signaling amplification and processing circuit 1156. Spectrum splitter/combiner circuit 1154 sends higher block B1 spectrum (H1) signals to the input of 1st downstream signaling amplification and processing circuit 1158. Spectrum splitter/combiner circuit 1160 communicates (outputs and receives) spectrum block B1 1112 signals via communications link 1134. Spectrum splitter/combiner circuit 1160 sends lower block B1 spectrum (LI) signals to the input of upstream signaling amplification and processing circuit 1156. Spectrum splitter/combiner circuit 1160 receives higher block B1 spectrum (H1) signals from the output of 1st downstream signaling amplification and processing circuit 1158.

Port 1144 is coupled, via communications link 1142, to a common port 1141 of spectrum splitter/combiner circuit 1140. In some embodiments, the common port of the spectrum splitter/combiner circuit 1140 is port 1144. Port 1144 receives, as input, upstream (reverse) RF spectrum signals. Port 1144 outputs downstream (forward) RF spectrum signals. Communications link 1142 carries combined spectrum signals including spectrum block B1 1112 signals, spectrum block B2 1114 signals, and spectrum block BN 1116 signals. Individual spectrum block port 1135 of spectrum splitter/combiner circuit 1140 is coupled to 1st amplification and processing circuit assembly 1128 via communications link 1134 over which spectrum block B1 1112 signals are communicated. Individual spectrum block port 1137 of spectrum splitter/combiner circuit 1140 is coupled to 1st additional downstream signaling amplification and processing circuit assembly 1130 via communications link 1136 over which spectrum block B2 1114 downstream signals are communicated. Individual spectrum block port 1139 of spectrum splitter/combiner circuit 1140 is coupled to Nth additional downstream signaling amplification and processing circuit assembly 1132 via communications link 1138 over which spectrum block BN 1116 downstream signals are communicated.

AGC/ALSC circuit 1146 includes thermal compensation control circuitry and a multi-pilot temperature compensation network. AGC/ALSC circuit 1146 is coupled to 1st amplification and processing circuitry 1128 via bus 1148. AGC/ALSC circuit 1146 is coupled to 1st additional downstream signaling amplification and processing circuitry 1130 via bus 1150. AGC/ALSC circuit 1146 is coupled to Nth additional downstream signaling amplification and processing circuitry 1132 via bus 1152. In some embodiments, bus 1148 comprises lines 1148a, 1148b and 1148c: bus 1150 comprises lines 1150a, 1150b and 1150c: and bus 1152 comprises lines 1152a, 1152b and 1152c. (See FIG. 13.) The power supply 1147 receives input power, e.g., externally sourced AC power and/or battery back-up power, generates various DC power levels, and supplies the generated DC power to the amplification and processing circuitry (1128, 1130, 1132) and the AGC/ALSC 1146 via a power distribution bus.

A spectrum splitter/combiner circuit is a multiport device including at least one combined spectrum port (sometimes referred to as a common port) and multiple individual spectrum block ports. The spectrum splitter/combiner circuit routes, e.g., passes (with minimal attenuation), signals corresponding to spectrum blocks between the combined spectrum port and individual spectrum block ports depending on its configuration.

For example, with regard to FIG. 11, spectrum splitter combiner circuit 1120 routes signals, e.g., passes signals, corresponding to spectrum block B1 1112 between combined spectrum port 1119 and individual spectrum port 1121. Signals routed by splitter combiner circuit 1120 corresponding to spectrum block B1 1112 include upstream signals, corresponding to a lower portion of spectrum block B1, and downstream signals corresponding to an upper portion of spectrum block B1. Spectrum splitter combiner circuit 1120 routes signals (downstream signals), e.g., passes signals, corresponding to spectrum block B2 1114 between combined spectrum port 1119 and individual spectrum port 1123. Spectrum splitter combiner circuit 1120 routes signals (downstream signals), e.g., passes signals, corresponding to spectrum block BN 1116 between combined spectrum port 1119 and individual spectrum port 1125. The spectrum splitter/combiner circuit 1120 splits received downstream signals corresponding an upper portion of spectrum block B1, spectrum block B2 and spectrum block BN, which were received as input via combined spectrum port (common port) 1119 and outputs: i) downstream signals corresponding to the upper portion of spectrum block B1 on individual spectrum port 1121, ii) downstream signals corresponding to spectrum block B2 on individual spectrum port 1123, and iii) downstream signals corresponding to spectrum block BN on individual spectrum port 1125. Thus, in this example spectrum splitter/combiner circuit 1120 functions as a signal splitting circuit with regard to downstream signals. Spectrum splitter/combiner circuit 1120 also routes, e.g., passes, upstream signals, corresponding to a lower portion of spectrum block B1, received on individual spectrum port 1121 to combined spectrum port (common port) 1119.

With regard to FIG. 11, spectrum splitter combiner circuit 1140 routes signals, e.g., passes signals, corresponding to spectrum block B1 1112 between combined spectrum port 1141 and individual spectrum port 1135. Signals routed by splitter combiner circuit 1140 corresponding to spectrum block B1 1112 include upstream signals, corresponding to a lower portion of spectrum block B1, and downstream signals corresponding to an upper portion of spectrum block B1. Spectrum splitter combiner circuit 1140 routes signals (downstream signals), e.g., passes signals, corresponding to spectrum block B2 1114 between combined spectrum port 1141 and individual spectrum port 1137. Spectrum splitter combiner circuit 1140 routes signals (downstream signals), e.g., passes signals, corresponding to spectrum block BN 1116 between combined spectrum port 1141 and individual spectrum port 1139. The spectrum splitter/combiner circuit 1140 combines: i) received downstream signals corresponding an upper portion of spectrum block B1 which were received as input via individual spectrum port 1135, ii) received downstream signals corresponding spectrum block B2 which were received as input via individual spectrum port 1137, and received downstream signals corresponding spectrum block BN which were received as input via individual spectrum port 1139, and outputs the combined spectrum downstream signals via combined spectrum port (common port) 1141. Thus, in this example spectrum splitter/combiner circuit 1140 functions as a signal combining circuit with regard to downstream signals. Spectrum splitter/combiner circuit 1140 also routes, e.g., passes, upstream signals, corresponding to a lower portion of spectrum block B1, received on combined spectrum port (common port) 1141 to individual spectrum port 1135.

Figure 12:
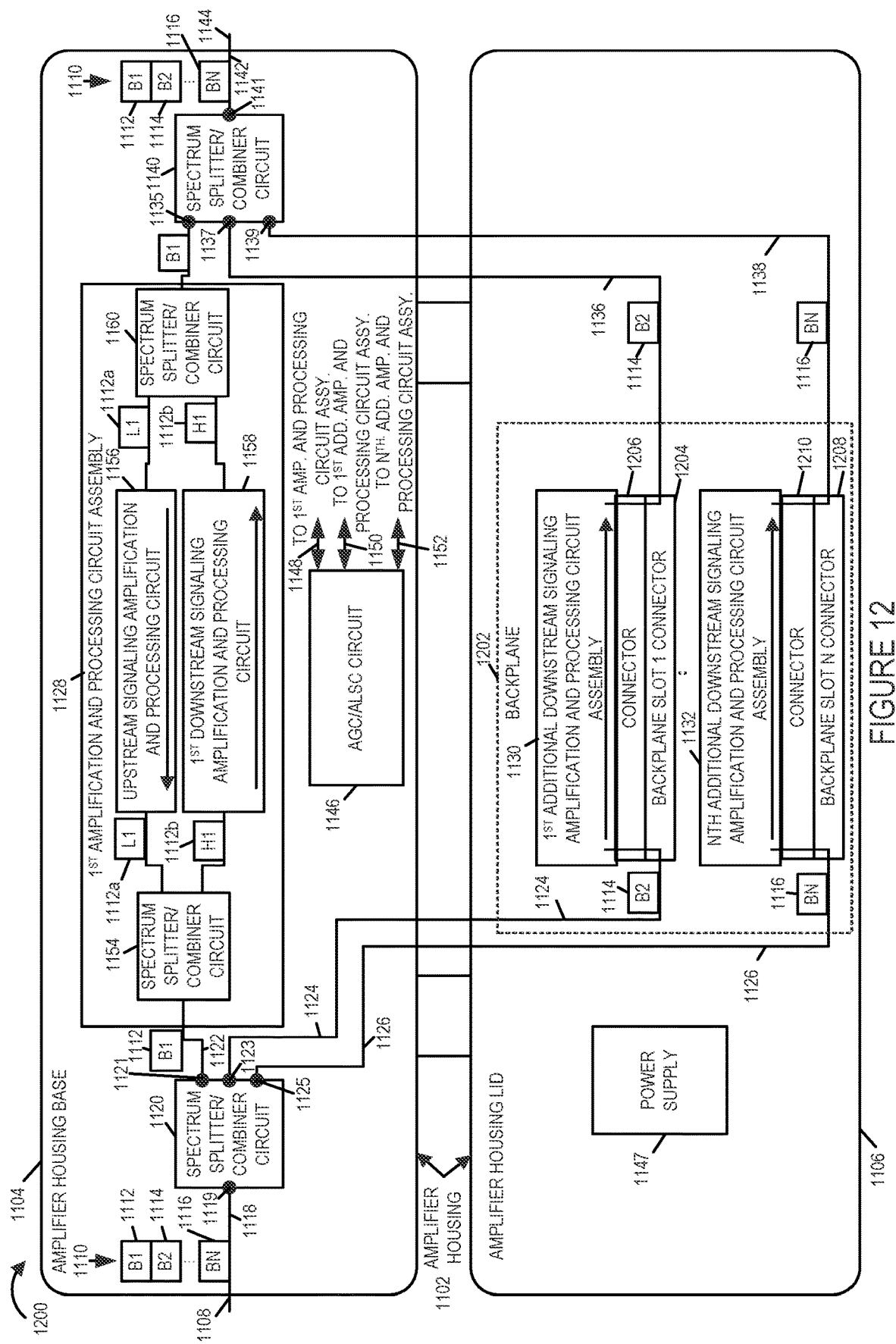
FIG. 12 is a drawing of an exemplary modular radio frequency (RF) amplifier assembly in which the amplifier housing lid includes a backplane with a plurality of backplane slot connectors for accepting insertable additional downstream amplification and processing circuit assemblies.

FIG. 12 is a drawing of an exemplary modular radio frequency (RF) amplifier assembly 1200 in accordance with an exemplary embodiment. Exemplary modular radio frequency (RF) amplifier assembly 1200 of FIG. 12 is one exemplary embodiment of the modular radio frequency (RF) amplifier assembly 1100 of FIG. 11, in which the amplifier housing lid 1106 includes a backplane 1202 with a plurality of backplane slot connectors (backplane slot 1 connector 1204, backplane slot N connector 1208). The 1st additional downstream signaling amplification and processing circuit 1130 includes a connector 1206, which plugs into backplane slot 1 connector 1204 of backplane 1202. The Nth additional downstream signaling amplification and processing circuit 1132 includes a connector 1210, which plugs into backplane slot N connector 1208 of backplane 1202.

Figure 13:
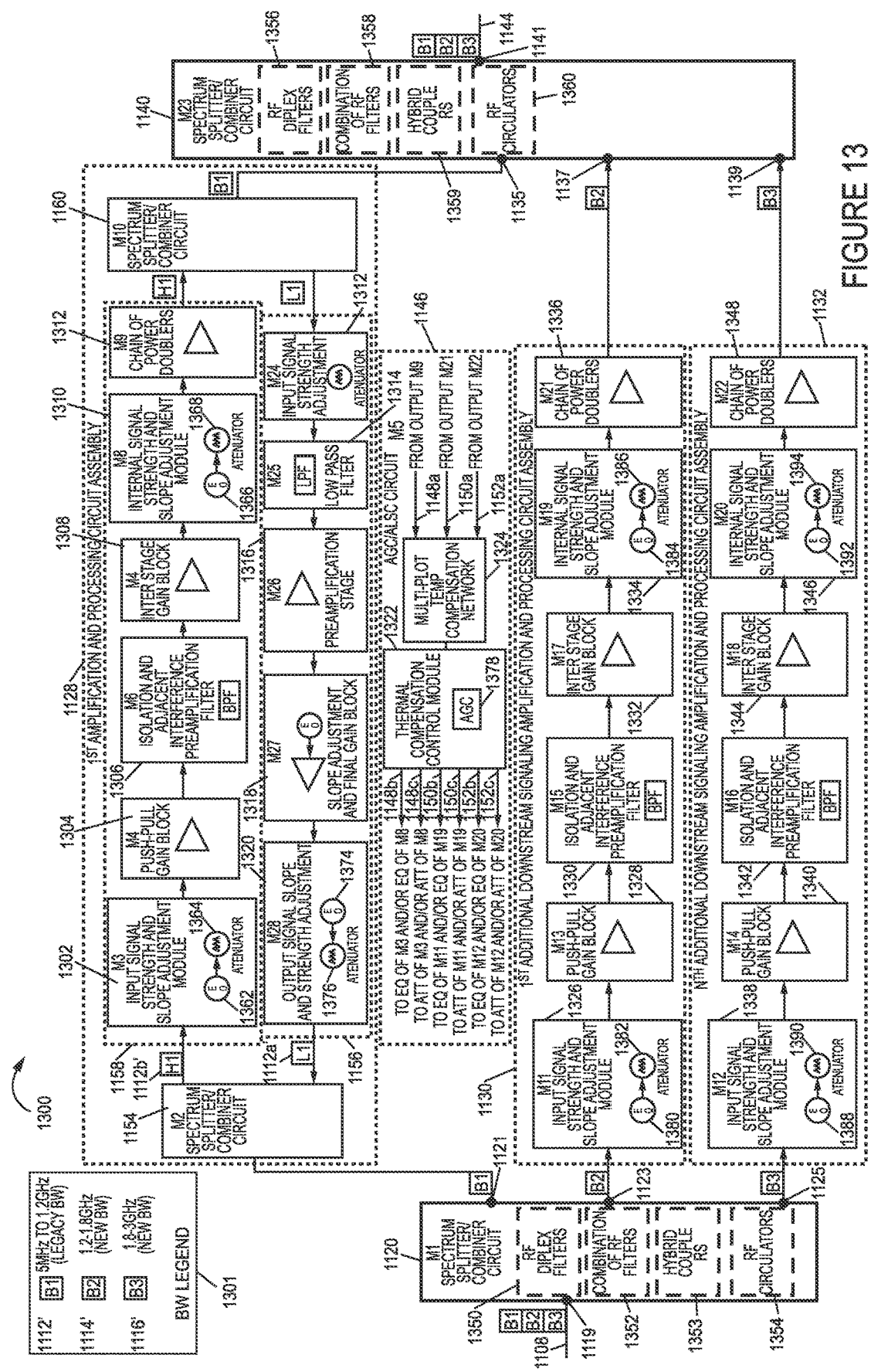
FIG. 13 is a drawing illustrating more details with regard to exemplary circuitry within components (first spectrum spitter/combiner circuit, 1st amplification and processing assembly, AGC/ALSC circuit, 1st additional downstream signaling amplification and processing circuit assembly, Nth additional downstream signaling amplification and processing circuit assembly, and second spectrum splitter/combiner circuit) in the exemplary modular amplifier assembly of FIG. 11 in accordance with an exemplary embodiment.

FIG. 13 is a drawing 1300 illustrating more details with regard to exemplary circuitry within components (spectrum spitter/combiner circuit 1120, 1st amplification and processing assembly 1128, AGC/ALSC circuit 1146, 1st additional downstream signaling amplification and processing circuit assembly 1130, Nth additional downstream signaling amplification and processing circuit assembly 1132, and spectrum splitter/combiner circuit 1140, in an exemplary modular amplifier assembly 1100 in accordance with an exemplary embodiment. In the example of FIG. 13, N=3, with regard to the spectrum frequency blocks. Legend 1301 indicates that spectrum block B1 1112' corresponds to 5 MHz to 1.2 G Hz (legacy BW), spectrum block B2 1114' corresponds to 1.2 GHz-1.8 G Hz (new bandwidth) and spectrum block B3 1116' corresponds to 1.8 GHZ-3 GHz.

Spectrum splitter/combiner circuit (designated module M1) 1120 includes combined spectrum port (sometimes referred to as a common port) 1119 corresponding to the combination of spectrum blocks B1 1112', B2 1114' and B3 1116', individual spectrum block port 1121 corresponding to spectrum block B1 1112', individual spectrum block port 1123 corresponding to spectrum block B2 1114' and individual spectrum block port 1125 corresponding to spectrum block B3 1116'. Spectrum splitter/combiner circuit (designated module M1) 1120 includes RF diplex filters 1350, a combination of RF filters 1352, hybrid couplers 1153, and/or RF circulators 1354. In various embodiments, spectrum splitter/combiner circuit (M1) 1120 is a high isolation passive circuit. In some embodiments, spectrum splitter/combiner circuit (M1) 1120 does not include any diplexers but includes a combination of one or more RF filters, and/or one or more hybrid couplers and/or one or more RF circulators.

With regard to FIG. 13, spectrum splitter combiner circuit 1120 routes signals, e.g., passes signals, corresponding to spectrum block B1 1112' between combined spectrum port

1119 and individual spectrum port 1121. Signals routed by splitter combiner circuit 1120 corresponding to spectrum block B1 1112' include upstream signals, corresponding to a lower portion of spectrum block B1, and downstream signals corresponding to an upper portion of spectrum block B1. Spectrum splitter combiner circuit 1120 routes signals (downstream signals), e.g., passes signals, corresponding to spectrum block B2 1114' between combined spectrum port 1119 and individual spectrum port 1123. Spectrum splitter combiner circuit 1120 routes signals (downstream signals), e.g., passes signals, corresponding to spectrum block B3 1116' between combined spectrum port 1119 and individual spectrum port 1125. The spectrum splitter/combiner circuit 1120 splits received downstream signals corresponding an upper portion of spectrum block B1, spectrum block B2 and spectrum block B3, which were received as input via combined spectrum port (common port) 1119 and outputs: i) downstream signals corresponding to the upper portion of spectrum block B1 on individual spectrum port 1121, ii) downstream signals corresponding to spectrum block B2 on individual spectrum port 1123, and iii) downstream signals corresponding to spectrum block B3 on individual spectrum port 1125. Thus, in this example spectrum splitter/combiner circuit 1120 functions as a signal splitting circuit with regard to downstream signals. Spectrum splitter/combiner circuit 1120 also routes, e.g., passes, upstream signals, corresponding to a lower portion of spectrum block B1, received on individual spectrum port 1121 to combined spectrum port (common port) 1119.

With regard to FIG. 13, spectrum splitter combiner circuit 1140 routes signals, e.g., passes signals, corresponding to spectrum block B1 1112' between combined spectrum port 1141 and individual spectrum port 1135. Signals routed by splitter combiner circuit 1140 corresponding to spectrum block B1 1112' include upstream signals, corresponding to a lower portion of spectrum block B1, and downstream signals corresponding to an upper portion of spectrum block B1. Spectrum splitter combiner circuit 1140 routes signals (downstream signals), e.g., passes signals, corresponding to spectrum block B2 1114' between combined spectrum port 1141 and individual spectrum port 1137. Spectrum splitter combiner circuit 1140 routes signals (downstream signals), e.g., passes signals, corresponding to spectrum block B3 1116' between combined spectrum port 1141 and individual spectrum port 1139. The spectrum splitter/combiner circuit 1140 combines: i) received downstream signals corresponding an upper portion of spectrum block B1 which were received as input via individual spectrum port 1135, ii) received downstream signals corresponding to spectrum block B2 which were received as input via individual spectrum port 1137, and received downstream signals corresponding to spectrum block B3 which were received as input via individual spectrum port 1139, and outputs the combined spectrum downstream signals via combined spectrum port (common port) 1141. Thus, in this example spectrum splitter/combiner circuit 1140 functions as a signal combining circuit with regard to downstream signals. Spectrum splitter/combiner circuit 1140) also routes, e.g., passes, upstream signals, corresponding to a lower portion of spectrum block B1, received on combined spectrum port (common port) 1141 to individual spectrum port 1135.

Spectrum splitter/combiner circuit (module M1) 1120 is a multi-port network that splits an incoming broadband signal from a common port 1119 into two or more paths, dependent on frequency. The spectrum splitter/combiner (module M1) can be implemented using different RF filtering technologies to achieve low RF insertion loss and high RF isolation configurations to separate and route two or more different frequency bands for processing, while avoiding amplifier instability or excessive group delay at the RF band edges of the different frequency bands. The spectrum splitter/combiner circuit 1120 is designed to split an incoming RF signal with little to no degradation due to impedance mismatches into multiple paths (B1, B2 and B3 in one embodiment) to feed multiple RF amplifications blocks. Splitting of the incoming RF signal can be, and sometimes is, accomplished using a combination of available technologies including, but not limited to:

Diplex Filters. A diplexer is the simplest form of a multiplexer consisting of a three-port network that separates signals from a common RF port into two paths based on frequency. In embodiments of the present disclosure, legacy RF diplex filters continue to be leveraged for the separation and combining of RF signals within the legacy frequency block from 5 MHz to about 1.2 GHz and enable amplification of legacy forward and return RF spectrum without interference while preserving the various RF downstream/upstream split options as partially illustrated in FIG. 8.

RF filter combinations. RF filters, e.g., low-pass RF filters, high-pass RF filters, and/or band-pass RF filters can be, and sometimes are, used in various combinations, in one or more embodiments of the present invention, to separate or combine an RF signal into multiple frequency blocks or frequency bands prior to or following an RF amplification process. In some embodiments a combination of low-pass, high-pass and/or band-pass filters tuned for operation at specific frequency bands can be, and sometimes are, used to separate an incoming RF signal into multiple frequency paths consisting of a legacy frequency block from about 5 MHz to about 1.2 GHZ, and one or more extended frequency blocks encompassing the RF spectrum from about 1.2 GHz to about 3.0 GHz or possibly higher frequencies. This solution can be, and in some embodiments is, designed to provide low RF insertion loss and high RF isolation in the 40 dB to 90 dB range.

RF Circulators. These directional RF devices can be, and sometimes are, used in some embodiments to process and route incoming RF signals from port to port with minimal insertion loss while also preventing RF interference through increased RF isolation between frequency bands. RF circulators can be, and sometimes are, employed within an exemplary embodiment in accordance with the present invention, to isolate and separate RF frequencies while minimizing RF signal insertion losses and cancelling out unwanted RF reflections.

Hybrid couplers. These two-way devices can be, and sometimes are, used in some embodiments in combination with additional RF filters to split and combine RF signals while maintaining RF isolation between frequency bands. Hybrid RF couplers can be, and sometimes are, employed within embodiments, in accordance with the present invention, to optimize separation and re-combining of RF signals while minimizing cross-over and guard band requirements.

1st amplification and processing circuit assembly 1128 includes spectrum splitter/combiner circuit (block M2) 1154, 1st downstream signaling amplification and processing circuit 1158, upstream signaling amplification and processing circuit 1156, and spectrum splitter/combiner circuit (block M10) 1160. 1st downstream signaling amplification and processing circuit 1158 includes an input signal strength and slope adjustment module (M3) 1302 including an equalizer 1362 and an attenuator 1364, a gain block (M4) 1304, an isolation and adjacent interference pre-amplification filter (M6) 1306, e.g., a band pass filter (BPF), an inter-stage gain block (M7) 1308, and a chain of power doublers (M9) 1312, coupled together as shown.

Upstream signaling amplification and processing circuit 1156 includes an input signal strength adjustment module (M24) 1312, a low pass filter (LPF) (M25) 1314, a pre-amplification stage (M26) 1316, a slope adjustment and final gain block (M27) 1318 including an equalizer 1370 and an amplifier 1372, and an output signal slope and strength adjustment module (M28) 1320 including an equalizer 1374 and an attenuator 1376, coupled together as shown.

AGC/ALSC circuit (block M5) 1146 includes a thermal compensation and control module 1322 including an AGC 1378, coupled to a multi-pilot temperature compensation network 1324.

1st additional downstream signaling amplification and processing circuit assembly 1130 includes an input signal strength and slope adjustment module (M11) 1326 including an equalizer 1380 and an attenuator 1382, a gain block (M13) 1328, e.g., a push-pull amplifier gain block, an isolation and adjacent interference pre-amplification filter (M15) 1330, e.g., a bandpass filter (BPF), an inter stage gain block (M17) 1332, an internal signal strength and slope adjustment module (M19) 1334 including an equalizer 1384 and an attenuator 1386, and a chain of power doublers (M21) 1336.

NTH. additional downstream signaling amplification and processing circuit assembly 1132 includes an input signal strength and slope adjustment module (M12) including an equalizer 1388 and an attenuator 1390, a gain block (M14) 1340, e.g., a push-pull amplifier gain block, an isolation and adjacent interference pre-amplification filter (M16) 1342, e.g., a bandpass filter (BPF), an inter stage gain block (M18) 1344, an internal signal strength and slope adjustment module (M20) 1346 including an equalizer 1392 and an attenuator 1394, and a chain of power doublers (M22) 1348.

Block M2 1154 receives at its input the legacy frequency band from 5 MHz to about 1.2 GHz and separates/combines RF signal into forward and return spectra using either fixed diplex filters or diplexer-less solutions, e.g., as implemented in prior art, to enable RF amplification of legacy forward and return RF spectrum while implementing various RF downstream/upstream split options as partially illustrated in FIG. 8.

Block M3 1302 implements signal strength and slope adjustment of the legacy downstream frequency band using equalizers 1362 and attenuators 1364 to condition the RF signal prior to the pre-amplifier stage.

Block M4 1304, which is a gain block, e.g., a push-pull (PP) gain block, is used to provide low distortion, high efficiency and high output power for the legacy downstream frequency band.

Block M5 1322 controls automatic gain control (AGC) and/or automatic level and slope control (ALSC) circuitry to compensate for variations in RF output signal level as a result of outside plant cable loss variations with temperature. AGC and/or ALSC maintain a suitable signal level and tilt at the output of RF amplifiers. The Multi-Pilot temperature compensation network 1324 is a closed-loop feedback system whose objective is to establish a linear input to output signal relationship, maintaining a desired constant output in the amplifier. In one embodiment of this disclosure, the Multi-pilot network 1324 continuously monitors the output of three output gain blocks (M9 1312, M21 1336 and M22 1348) and based on variations in selected RF output reference signals (pilots) for each of the amplification blocks, the gain of each of the output amplification blocks is controlled at either or both M3 1302 and M8 1310; either or both M11 1326 and M19 1334; and either or both M12 1338 and M20 1346 in order to maintain the RF amplifier outputs to a constant desired value. Line 1148a couples M9 1312 to multi-pilot network 1324 and conveys monitored gain output from M9 1312 to network 1324. Line 1150a couples M21 1336 is to multi-pilot network 1324 and conveys monitored gain output from M21 1336 to network 1324. Line 1152a couples M22 1348 to multi-pilot network 1324 and conveys monitored gain output from M22 1348 to network 1324. The dynamic range of operation for the Multi-pilot network supports the frequency bandwidth of all the three amplification blocks as a minimum. In other possible embodiments that implement additional RF output gain blocks, the Multi-pilot network functionality expands accordingly to monitor and adjust the output of multiple gain blocks.

The multi-pilot network in M5 1146 also incorporates an error detection circuit for higher accuracy and a bounded-input, bounded-output (BIBO) circuit to improve stability over a wide frequency range. The multi-pilot network also incorporates an option to adjust gain limits upon input and output RF signal range variations. When using an AGC circuit, only the gain of the output stage for each amplification and processing block is adjusted, and only one reference signal or pilot is required per amplification block. When an ALSC circuit is implemented, both the gain and slope are controlled for each of the output gain blocks, and a minimum of two reference signals or pilots are required per amplification block in order to maintain constant slope and output levels for each the blocks. In one exemplary embodiment slope control line 1148b is coupled to equalizer 1362 of M3 1302 and equalizer 1366 of M8 1310: gain control line 1148c is coupled to attenuator 1364 of M3 1302 and attenuator 1368 of M8 1310; slope control line 1150b is coupled to equalizer 1380 of M11 1326 and equalizer 1384 of M19 1334; gain control line 1150c is coupled to attenuator 1382 of M11 1326 and attenuator 1386 of M19 1334; slope control line 1152b is coupled to equalizer 1388 of M12 1338 and equalizer 1392 of M20 1346; and gain control line 1152c is coupled to attenuator 1390 of M12 1338 and attenuator 1394 of M20 1346. The AGC and/or ASLC do not operate in the absence of an RF signal, but once the input RF signal meets a configured threshold, the AGC and/or ASLC function is activated. After a maximum configured RF threshold is reached, the AGC and/or ASLC function stops to avoid stability issues.

Block M6 1306 implements additional RF filtering for the legacy downstream frequency band to further improve isolation and avoid adjacent interference during pre-amplification.

Block M7 1308 is an inter-stage gain block also known as the driver stage and is used to provide and sink enough current at the operating legacy downstream frequency bandwidth to drive a low impedance load (75 Ohm).

Block M8 1310 implements internal signal strength and slope adjustment for the legacy downstream frequency band prior to the output gain block.

Block M9 1312 typically includes a chain of power doublers (PDs) in the final gain stage for the legacy downstream frequency band at the output of a CATV amplifier.

Block M10 1160 combines the legacy forward and legacy reverse path RF signals for transmission over the common path of the coaxial cable.

Block M24 1312 implements signal strength adjustment of the legacy return frequency band using attenuators to condition the RF signal prior to the pre-amplifier stage.

Block M25 1314 implements a low pass filter of the legacy return frequency band to further improve isolation between legacy forward and return signals, and to avoid adjacent interference during pre-amplification.

Block M26 1316 implements a pre-amplification stage to improve efficiency by amplifying the legacy return signals to an optimal level prior to the final amplification block.

Block M27 1318 implements an inter-stage equalizer to flatten the legacy return signals prior to the output gain block, and typically implements a Gallium Arsenide (GaAs) hybrid technology to amplify return signals.

Block M28 1320 implements signal strength and slope adjustment of the legacy return frequency band, after amplification, using equalizers and attenuators to condition the RF output return signal prior to the diplex/combining block M2.

Figure 16:
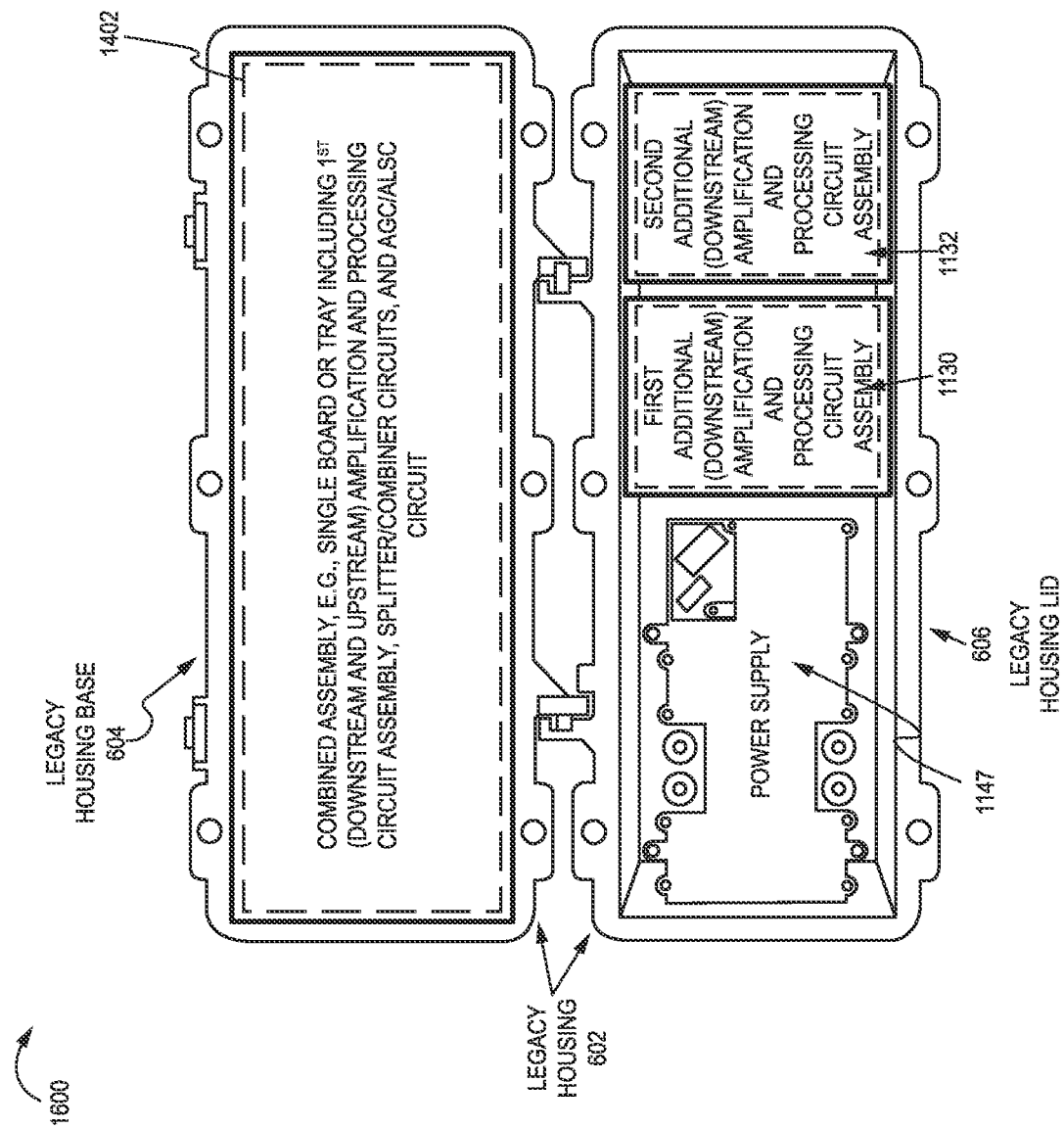
FIG. 16 is a drawing illustrating an exemplary embodiment of a modular RF amplifier assembly, in which a combined assembly, e.g., a single board or single tray including a 1st amplification and processing circuit assembly, a first splitter/combiner circuit, a second splitter/combiner circuit, and an AGC/ALSC circuit, is mounted in a base of a legacy housing.
Figure 17:
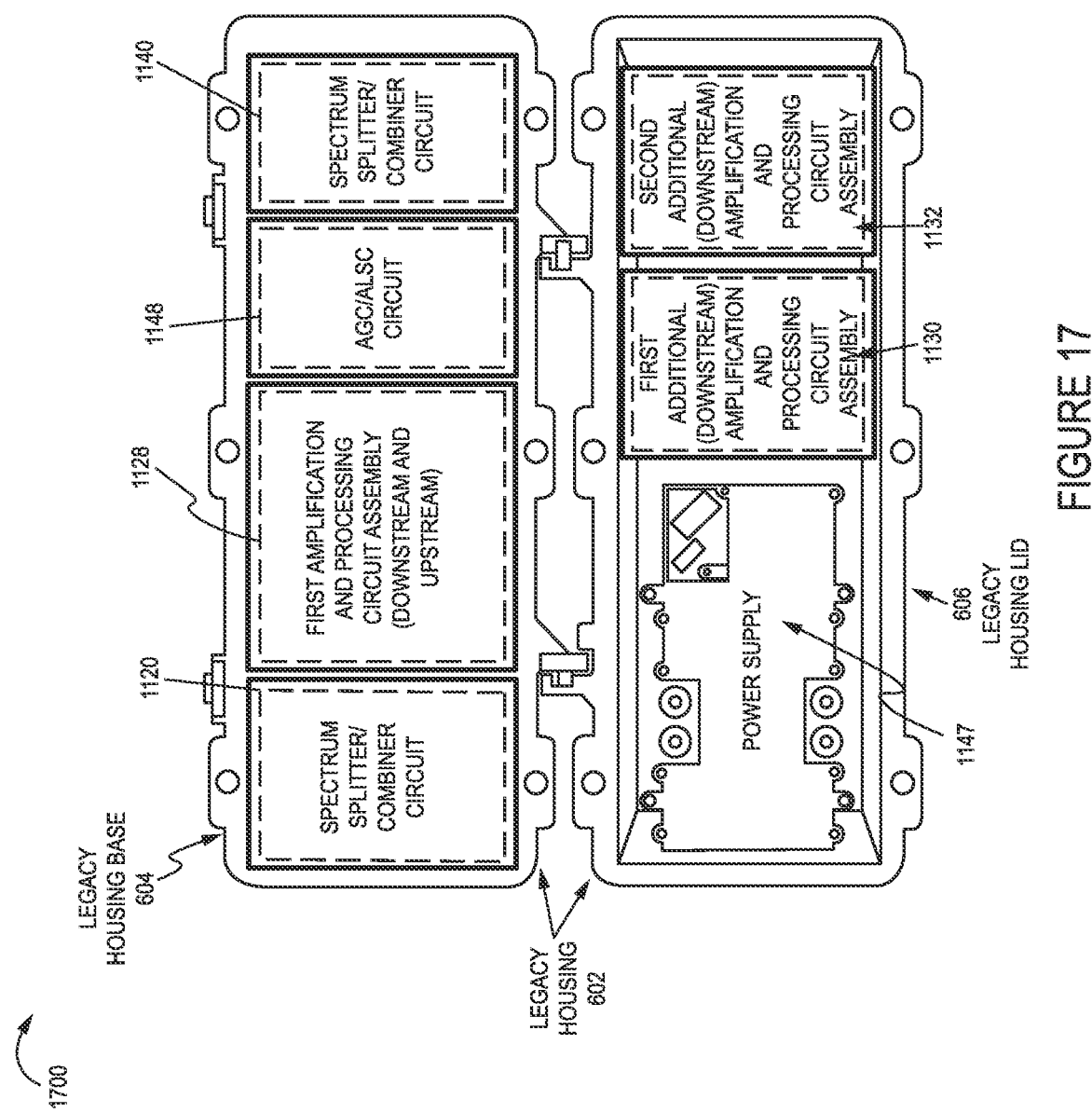
FIG. 17 is a drawing illustrating an exemplary embodiment of a modular RF amplifier assembly, in which in a first spectrum splitter/combiner circuit, a first amplification and processing circuit assembly, a second spectrum splitter/combiner circuit, and an AGC/ALSC circuit are each mounted as separate units within a legacy amplifier housing base.

In one embodiment, in accordance with the present invention, each of the RF functions for the legacy frequency band from about 5 MHz to about 1.2 GHz as described for blocks M1 through M10 and blocks M24 through M28, plus block M23 described later, are implemented within a single legacy-style RF tray that fits inside the base of a representative legacy amplifier housing, e.g., as illustrated in FIG. 16. In another embodiment, the functionality of M1 through M10, M24 through M28, and also block M23, is instead implemented within multiple, self-contained RF modules which can also be placed inside the base of a legacy housing as illustrated in FIG. 17. These discrete modules implement but are not limited to the following functions: RF input filtering module, RF amplification module, RF gain and level control module, and RF output combining module.

Blocks M11 1326 and M12 1338 implement signal strength and slope adjustment for the extended downstream frequency bands. The equalizer (1380, 1388) compensates for the loss variation of the input RF signal due to the coaxial cable. The attenuator (1382, 1390) adjusts the signal strength to condition the extended frequency bands prior to the pre-amplifier stage blocks.

Blocks M13 1328 and M14 1340 implement a gain block, e.g., a push-pull (PP) gain block, to provide low distortion, high efficiency and high output power for the extended downstream frequency bands.

Blocks M15 1330 and M16 1342 implement additional RF filtering to further improve isolation ahead of a pre-amplification stage.

Blocks M17 1322 and M18 1344 are inter-stage gain blocks also known as driver stages and are used to provide and sink enough current at the operating frequency bandwidth to drive a low impedance load (75 Ohm).

Blocks M19 1334 and M20 1346 implement internal signal conditioning using equalizers to adjust the frequency response evenly across the extended downstream frequency bandwidth of interest, and attenuators to adjust the optimal level to the last amplification stage.

Blocks M21 1336 and M22 1348 are output stage(s) for multiple extended downstream frequency bands using different design configurations including, but not limited to, push-pull designs including two matched transistors connected in a symmetrical configuration. Another configuration, used in some embodiments, is known as parallel hybrid, which can provide higher RF gain and improved distortion performance. Yet another configuration, used is some embodiments, is known as feed forward and offers a significant performance improvement at higher RF output levels. Other design configurations are also possible and may be implemented in some embodiments in accordance with the present invention.

Spectrum splitter/combiner circuit (designated module M23) 1140 includes individual spectrum block port 1135 corresponding to spectrum block B1 1112', individual spectrum block port 1137 corresponding to spectrum block B2 1114', individual spectrum block port 1139 corresponding to spectrum block B3 1116' and combined spectrum port (sometimes referred to as a common port) 1141 corresponding to the combination of spectrum blocks B1 1112', B2 1114' and B3 1116'. Spectrum splitter/combiner circuit (designated module M23) 1140 includes RF diplex filters 1356, a combination of RF filters 1358, hybrid couplers 1359, and/or RF circulators 1360. In various embodiments, spectrum splitter/combiner circuit (M23) 1140 is a high isolation passive circuit. In some embodiments, spectrum splitter/combiner circuit (M23) 1140 does not include any diplexers but includes a combination of one or more RF filters, and/or one or more hybrid couplers and/or one or more RF circulators.

Block M23 1140 implements the final RF combining of all the frequency blocks post-amplification. This block combines the legacy frequency block from about 5 MHz to about 1.2 GHZ, and one or more extended frequency blocks encompassing the RF spectrum from about 1.2 GHz to about 3.0 GHz or possibly higher frequencies. RF signal combining of multiple RF blocks is done with little to no degradation and can be accomplished using a combination of available technologies including, but not limited to: i) Diplex Filters, ii) RF filters and/or iii) RF Circulators.

As previously noted, a diplexer is the simplest form of a multiplexer consisting of a three-port network that separates signals from a common RF port into two paths based on frequency. In embodiments of the present disclosure, legacy RF diplex filters continue to be leveraged for the separation and combining of RF signals within the legacy frequency block from 5 MHz to about 1.2 GHZ, and enable amplification of legacy forward and return RF spectrum without interference while preserving the various RF downstream/upstream split options as partially illustrated in FIG. 8 RF filter combinations.

RF filters, e.g., low-pass RF filters, high-pass RF filters, and/or band-pass RF filters can be, and sometimes are, used in various combinations, in one or more embodiments of the present invention, to separate or combine an RF signal into multiple frequency blocks or frequency bands prior to or following an RF amplification process. In some embodiments a combination of low-pass, high-pass and/or band-pass filters tuned for operation at specific frequency bands can be, and sometimes are, used to combine RF signals from multiple frequency paths consisting of a legacy frequency block from about 5 MHz to about 1.2 GHz, and one or more extended frequency blocks encompassing the RF spectrum from about 1.2 GHz to about 3.0 GHz or possibly higher frequencies. This solution will be designed to provide low RF insertion loss and high RF isolation.

RF Circulators are directional RF devices which can be, and sometime are, used in some embodiments to process and route incoming RF signals from port to port with minimal insertion loss while also preventing RF interference through increased RF isolation between frequency bands. RF circulators can be, and sometimes are, employed within an exemplary embodiment in accordance with the present invention, to isolate and separate RF frequencies while minimizing RF signal insertion losses and cancelling out unwanted RF reflections.

Hybrid couplers are two-way devices can be, and sometimes are, used in some embodiments in combination with additional RF filters to combine RF signals while maintaining RF isolation between frequency bands. Hybrid RF couplers can be, and sometimes are, employed within embodiments, in accordance with the present invention, to optimize separation and re-combining of RF signals while minimizing cross-over and guard band requirements.

In various embodiments in accordance with the present invention, the RF functions as described for blocks M11, M13, M15, M17, M19 and M21 and separately for blocks M12, M14, M16, M18, M20, and M22, and corresponding to the parallel processing of two separate extended frequency bands encompassing the RF spectrum from about 1.2 GHz to about 3.0 GHz or possibly higher frequencies, are each implemented within multiple, self-contained RF modules which are placed inside the lid of a legacy amplifier housing as illustrated in both FIG. 16 and FIG. 17. Other implementations based on the parallel processing of more than two extended frequency bands, each implemented within its own discrete RF module, are also possible and are implemented in some embodiments of the present invention.

Figure 14:
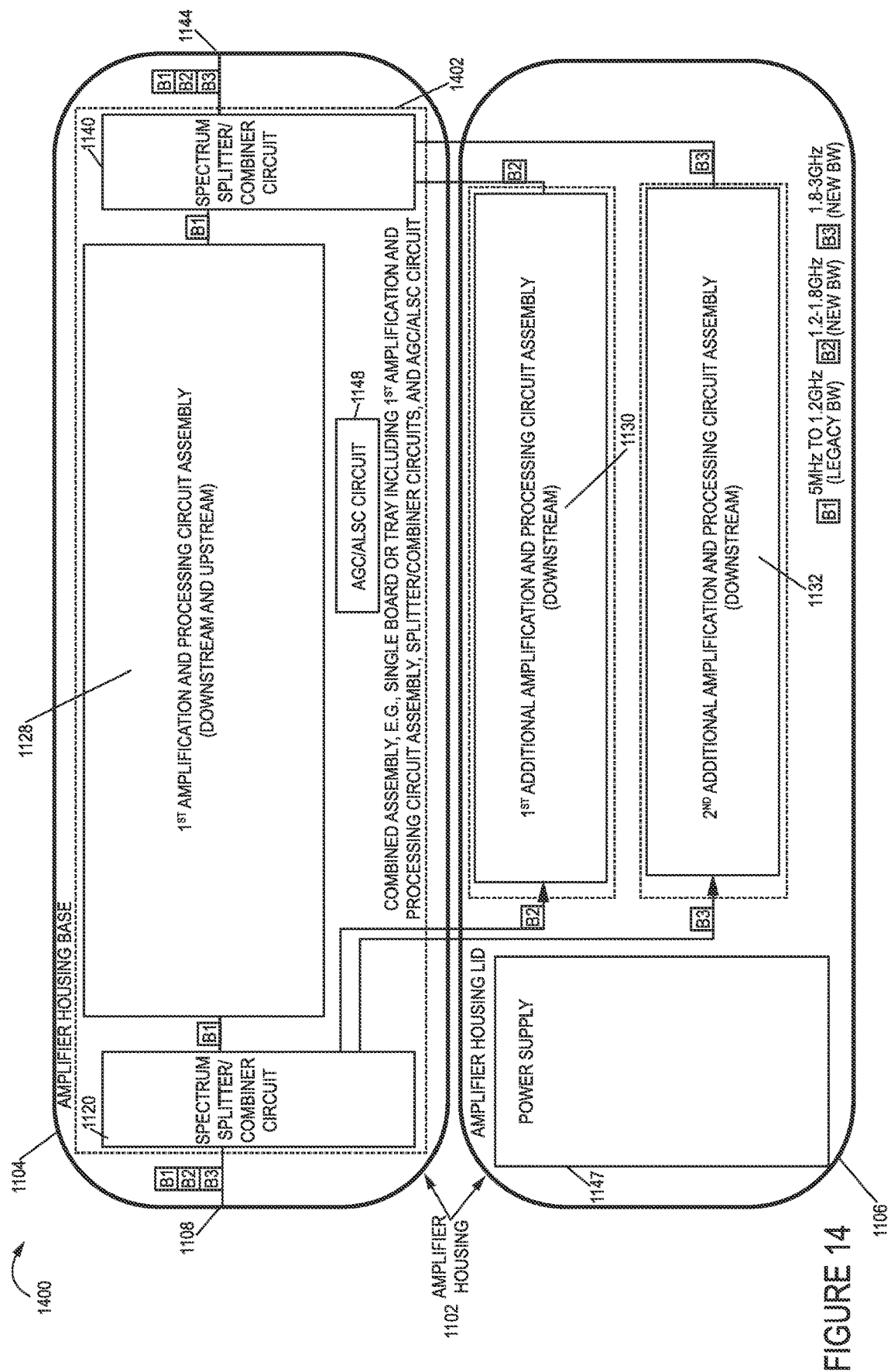
FIG. 14 is a drawing illustrating one exemplary embodiment of exemplary modular radio frequency (RF) amplifier assembly in which a first spectrum splitter/combiner circuit, a first amplification and processing circuit assembly, a second spectrum splitter/combiner circuit, and an AGC/ALSC circuit are included as part of a combined assembly, e.g., a single circuit board or single tray, mounted within the amplifier housing base.

FIG. 14 is a drawing 1400 illustrating one exemplary embodiment of exemplary modular radio frequency (RF) amplifier assembly 1100 of FIG. 11 in which spectrum splitter/combiner circuit 1120, the first amplification and processing circuit assembly 1128, the spectrum splitter/combiner circuit 1140, and the AGC/ALSC circuit 1148 are included as part of a combined assembly 1402, e.g., a single circuit board or single tray, mounted within the amplifier housing base 1104.

FIG. 14 illustrates an approach for the processing of input RF signals from about 5 MHz to about 3.0 GHZ, or possibly higher frequencies, in one embodiment that integrates a modular RF amplifier architecture in which a single RF tray 1402 installed in the base 1104 of an amplifier housing 1104 is used to process the legacy spectrum from about 5 MHz to about 1.2 GHZ. Implementation of second and third amplification and processing blocks (first additional downstream amplification and processing circuit assembly 1130 and second additional downstream amplification and processing circuit assembly 1132) to expand the downstream spectrum beyond 1.2 GHZ, as shown within the dash-lined boxes in the diagram, are intended to reside within the lid 1106 of the amplifier housing 1102.

Figure 15:
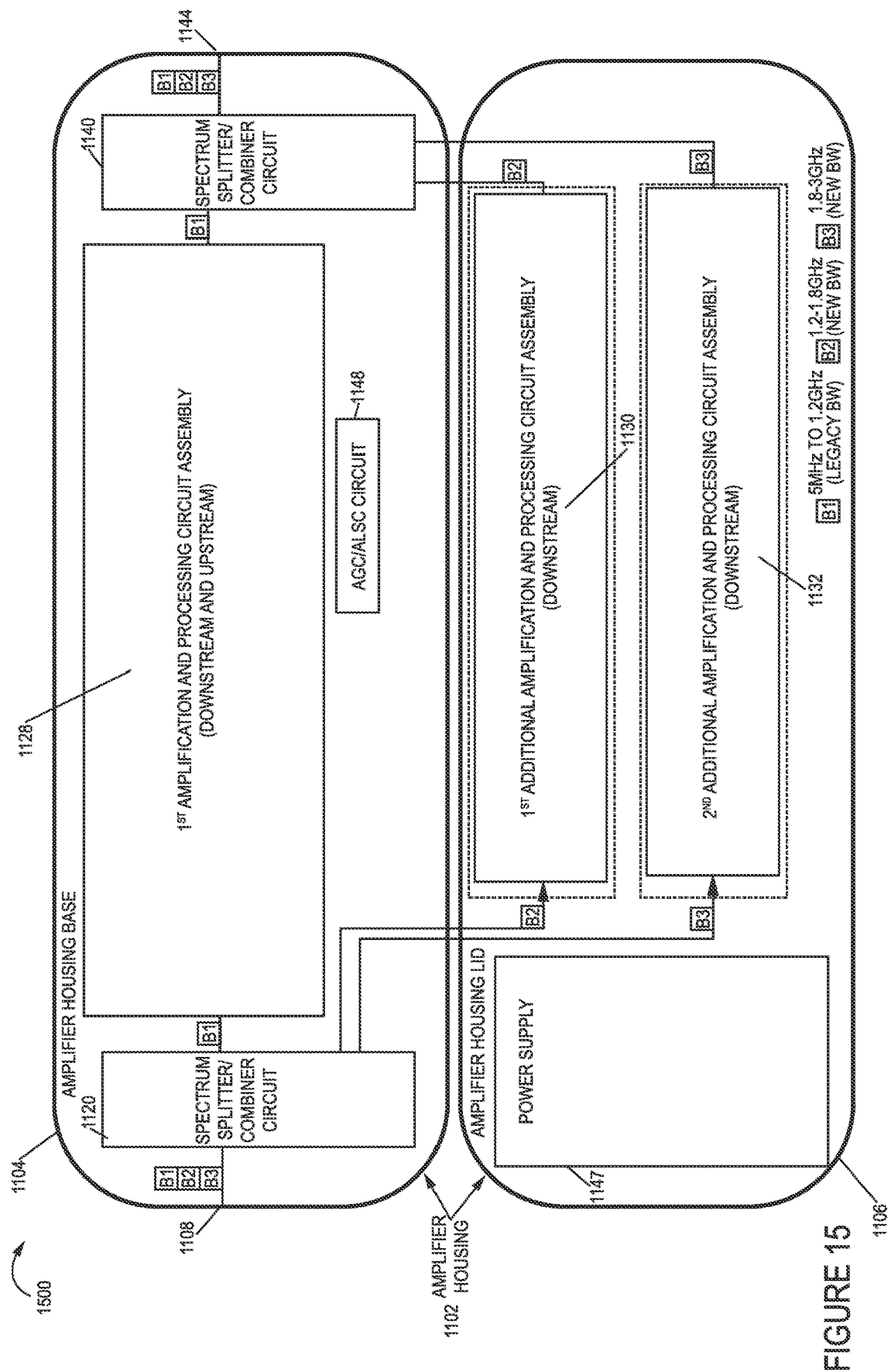
FIG. 15 is a drawing illustrating one exemplary embodiment of exemplary modular radio frequency (RF) amplifier assembly in which a first spectrum splitter/combiner circuit, a first amplification and processing circuit assembly, a second spectrum splitter/combiner circuit, and an AGC/ALSC circuit are each mounted as separate units within an amplifier housing base.

FIG. 15 illustrates an example of an embodiment of the present disclosure, also illustrated in FIG. 13, showing the placement of multiple modules inside the base of a representative legacy amplifier housing for the processing of legacy spectrum from about 5 MHz to about 1.2 GHZ. Multiple, self-contained RF modules inside the base of a legacy housing encompass but are not limited to the following functions: RF input filtering module, RF amplification module, RF gain and level control module, and RF output combining module. FIG. 15 also shows additional second and third RF amplification modules (first additional downstream amplification and processing circuit assembly 1130 and second additional downstream amplification and processing circuit assembly 1132) to process frequencies beyond 1.2 GHZ, inside the lid of the representative legacy amplifier housing.

FIG. 15 is a drawing 1500 illustrating one exemplary embodiment of exemplary modular radio frequency (RF) amplifier assembly 1100 of FIG. 11 in which spectrum splitter/combiner circuit 1120, the first amplification and processing circuit assembly 1128, the spectrum splitter/combiner circuit 1140, and the AGC/ALSC circuit 1148 are each mounted as separate units within the amplifier housing base 1104.

FIG. 15 illustrates an approach for the processing of input RF signals from about 5 MHz to about 3.0 GHZ, or possibly higher frequencies, in one embodiment that breaks down the processing of legacy spectrum from about 5 MHz to about 1.2 GHz into multiple, self-contained RF blocks, each encompassing but not limited to the following functions: RF input filtering module, RF amplification module, RF gain and level control module, and RF output combining module. In one embodiment these modules reside within the base 1104 of the amplifier housing 1102. Implementation of second and third amplification and processing blocks (first additional downstream amplification and processing circuit assembly 1130 and second additional downstream amplification and processing circuit assembly 1132) to expand downstream spectrum beyond 1.2 GHZ, as shown within the dash-lined boxes in the diagram, are intended to reside within the lid 1106 of the amplifier housing 1102.

FIG. 16 is a drawing 1600 illustrating an exemplary embodiment of a modular RF amplifier assembly, corresponding to FIG. 14, in which a combined assembly 1402, e.g., a single board or single tray including 1st amplification and processing circuit assembly 1128, splitter/combiner circuit 1120, splitter/combiner circuit 1140, and AGC/ALSC circuit 1148, is mounted in base 604 of legacy housing 602. The power supply 1147, first additional amplification and processing circuit assembly 1130 and the second additional amplification and processing circuit assembly 1332 are each installed as separate units within the legacy housing lid 606 of legacy housing 602. In some embodiments, the first additional amplification and processing assembly 1130 and the second additional amplification and processing assembly 1132 plug into slots in a backplane of the lid 606. In other embodiments, the first additional amplification and processing assembly 1130 and the second additional amplification and processing assembly are mounted independently to the lid 606, e.g., and coupled to other elements via individual connectors and cables.

FIG. 16 illustrates an example of an embodiment of the present disclosure, showing the placement of a single legacy-style RF tray 1402 to process the legacy spectrum from about 5 MHz to about 1.2 GHz inside the base 604 of a representative legacy amplifier housing 602. FIG. 16 also shows additional second and third RF amplification modules (first additional downstream amplification and processing circuit assembly 1130 and second additional downstream amplification and processing circuit assembly 1132) to process frequencies beyond 1.2 GHz, inside the lid 606 of the representative legacy amplifier housing 602.

In FIG. 16, it may be observed that the previously available unused space 611 in legacy housing cover 606 has been used to accommodate the amplifier and processing modules (first additional amplification and processing circuit assembly 1130 and the second additional amplification and processing circuit assembly 1332) which support RF downlink bandwidth expansions.

In FIG. 16, it may be observed that the space 702 in the legacy base 604 is now accommodating the two new spectrum splitter/combiner circuits (which supports the RF downlink bandwidth expansion) in addition to the 1st amplification and processing assembly and AGC/ALSC circuit.

FIG. 17 is a drawing 1600 illustrating an exemplary embodiment of a modular RF amplifier assembly, corresponding to FIG. 15, in which in spectrum splitter/combiner circuit 1120, the first amplification and processing circuit assembly 1128, the spectrum splitter/combiner circuit 1140, and the AGC/ALSC circuit 1148 are each mounted as separate units within the legacy amplifier housing base 604. The power supply 1147, first additional amplification and processing circuit assembly 1130 and the second additional amplification and processing circuit assembly 1332 are each installed as separate units within the legacy housing lid 606 of legacy housing 602. In some embodiments, the first additional amplification and processing assembly 1130 and the second additional amplification and processing assembly 1132 plug into slots in a backplane of the lid 606. In other embodiments, the first additional amplification and processing assembly 1130 and the second additional amplification and processing assembly are mounted independently to the lid 606, e.g., and coupled to other elements via individual connectors and cables.

FIG. 17 illustrates an example of an embodiment of the present disclosure showing the placement of multiple modules inside the base 604 of a representative legacy amplifier housing 602 for the processing of legacy spectrum from about 5 MHz to about 1.2 GHz. Multiple, self-contained RF modules inside the base 604 of a legacy housing 602 encompass but are not limited to the following functions: RF input filtering module, RF amplification module, RF gain and level control module, and RF output combining module. FIG. 17 also shows additional second and third RF amplification modules (first additional downstream amplification and processing circuit assembly 1130 and second additional downstream amplification and processing circuit assembly 1132) to process frequencies beyond 1.2 GHZ, inside the lid 606 of the representative legacy amplifier housing 602.

In FIG. 17, it may be observed that the previously available unused space 611 in legacy housing cover 606 has been used to accommodate the amplifier and processing modules (first additional amplification and processing circuit assembly 1130 and the second additional amplification and processing circuit assembly 1332) which support RF downlink bandwidth expansions. In FIG. 17, it may be observed that the space 702 in the legacy base 604 is now accommodating the two new spectrum splitter/combiner circuits (1120, 1140) (which supports the RF downlink bandwidth expansion) in addition to the 1st amplification and processing assembly (1128) and AGC/ALSC circuit (1148).

Various aspects and/or features of some embodiments of the present invention are further described below. Various exemplary embodiments are directed to a modular RF amplifier architecture and methodology, whereby the operational bandwidth of CATV legacy devices and systems, operating from about 5 MHz to about 1.2 GHz in a diplexer or diplexer-less wired communications network, can be, and sometimes are, expanded to operate from about 5 MHz to about 3.0 GHz or possibly higher frequencies.

In some embodiments, a modular RF amplifier methodology is used to optimize the RF layout within a defined/constrained space that fits in either existing legacy amplifier housings or new baseplates. This flexible, high-performance modular amplifier architecture can be, and sometimes is, scaled to support multiple amplifier configurations with either one, two, or more outputs supporting two or more operational frequency bands. A first amplification block from 5 MHz to 1.2 GHZ, a second amplification block from 1.2 GHz to 1.8 GHZ, or a third amplification block from 1.8 GHZ up to 3 GHZ or possibly higher frequencies are one of the options implemented in one embodiment.

An exemplary modular amplifier assembly, in some embodiments, includes a high isolation passive RF module that separates an incoming broadband RF signal from about 5 MHz up to 3.0 GHZ into multiple frequency bands. In some embodiments, the first frequency band will encompass legacy two-way spectrum from about 5 MHz to about 1.2 GHz and additional frequency bands will encompass extended one-way spectrum from about 1.2 GHz to about 3.0 GHZ. The bandwidth comprised within each of the additional frequency bands can be, and in some embodiments is, defined to further optimize this solution.

In accordance with a feature of some embodiments of the present invention, a multi-path RF processing approach allows for the amplification of RF signals within multiple frequency blocks, including the legacy spectrum from about 5 MHZ to about 1.2 GHZ, and the simultaneous amplification of signals in the expanded spectrum from about 1.2 GHz to about 3.0 GHZ and potentially higher frequencies. In some embodiments, legacy upstream signals are processed as part of the legacy spectrum amplification block that will support different frequency splits. In various embodiments, legacy downstream signals are processed by the legacy spectrum amplification block, and additional (expanded) spectrum downstream signals are processed by one or more additional amplification blocks. In some such embodiments, upstream signals are not conveyed via the additional (expanded) spectrum and are not processed by the one or more additional amplification blocks.

In some embodiments, separate but parallel RF processing and amplification paths corresponding to multiple RF frequency bands are implemented to enable the use of RF hybrids and power amplifiers that operate over narrower forward (downstream direction) operational bandwidths to minimize cost, AC power consumption, thermal management and signal degradation.

In some embodiments, two or more multi-stage RF amplification sections, included in the modular amplifier assembly implemented in accordance with the present invention, are operated simultaneously in a parallel configuration. For example, a first multi-stage amplification section processes and amplifies signals within the legacy RF spectrum range from about 5 MHz to about 1.2 GHZ: and additional multi-stage amplification sections may, and sometimes do, process and amplify a subset of signals within the extended RF spectrum range from about 1.2 GHz to about 3.0 GHZ.

In some embodiments, an exemplary modular amplifier assembly, implemented in accordance with the present invention, includes traditional RF diplex filters to separate an incoming broadband signal from about 5 MHz to about 3.0 GHz into two or more frequency bands. In some other embodiments, an exemplary modular amplifier assembly, implemented in accordance with the present invention, includes a different high-isolation configuration (which is different than the traditional approach of using RF diplex filters), said different high isolation configuration using a combination of RF splitter/combiners, coupled with both high-pass and low-pass RF filters, to separate an incoming broadband RF signal from about 5 MHz to about 3.0 GHz into two or more frequency bands.

In some embodiments, the first frequency band encompasses the legacy two-way spectrum from about 5 MHz to about 1.2 GHZ, and the additional frequency bands encompass the extended one-way spectrum from about 1.2 GHz to about 3.0 GHz or higher.

In some embodiments in accordance with the present invention, the modular RF amplifier methodology and apparatus allows for the reduction or even the elimination of the requirement for a cross-over region or guard band between extended frequency block(s) through the implementation of spectrum spitter/combiner circuits, e.g., spectrum splitter/combiner circuits which do not use diplexers.

In some embodiments, a spectrum splitter/combiner circuit, included in an exemplary modular RF amplifier assembly, includes a combination of high-isolation couplers to process and combine incoming broadband signals that are output from two or more multi-stage RF amplification sections and to produce a single combined RF output from about 5 MHz to about 3.0 GHz or possibly higher frequencies.

In some embodiments, a spectrum splitter/combiner circuit, included in an exemplary modular RF amplifier assembly, includes RF circulators, to separate an incoming broadband RF signal from about 5 MHz to about 3.0 GHz or higher frequencies into two or more frequency bands. The first frequency band will encompass the legacy two-way spectrum from about 5 MHz to about 1.2 GHZ. The second and subsequent frequency bands will encompass the extended one-way spectrum from about 1.2 GHz to about 3.0 GHz or higher.

In some embodiments, a spectrum splitter/combiner circuit, included in an exemplary modular RF amplifier assembly includes cascaded RF filters, to process and combine incoming broadband signals that are output from two or more multi-stage RF amplification sections and produce a single combined RF output from about 5 MHz to about 3.0 GHz or higher frequencies.

In some embodiments, an exemplary modular RF amplifier assembly includes a single multi-pilot temperature compensation network, which is implemented to individually control RF operational gain and tilt over a defined temperature range for each of multiple RF amplification blocks within a legacy RF amplifier housing.

In some embodiments, an exemplary modular RF amplifier assembly is upgradeable, e.g., upgradable amplification stages are possible, and processing of multiple frequency bands is enabled by changing RF modules and filters without the need to replace existing RF amplifier housings.

In some embodiments, an exemplary modular RF amplifier assembly, implementing the multiple amplification and processing blocks implementation approach, in accordance with the present invention, enables RF shielding improvements (over existing legacy approaches of using a single amplification block for the entire spectrum) by providing better isolation of the individual amplification blocks in the base and lid of legacy RF amplifier housings.

List of Exemplary Numbered Embodiments

Exemplary Numbered Embodiment 1. A modular radio frequency (RF) amplifier assembly (1100) comprising: an amplifier housing (1102): a first spectrum splitter/combiner circuit (1120), mounted in said amplifier housing (1102): a first amplification and processing circuit assembly (1128) mounted in said amplifier housing (1102) and being coupled to said first spectrum splitter/combiner circuit (1120), said first amplification and processing circuit assembly (1128) being configured to amplify and pass signals in a first frequency band (e.g., B1 which is a legacy band), said first frequency band including a first downstream (forward path direction toward customer device) frequency band and an upstream (reverse path direction toward cable head end) frequency band, said first frequency band being used for both upstream and downstream signals (legacy band): a first additional amplification and processing circuit assembly (1130), mounted in said amplifier housing (1102) and being coupled to said first spectrum splitter/combiner circuit (1120), said first additional amplification and processing circuit assembly (1130) being configured to amplify and pass signals in a first additional frequency band (e.g., B2 which is a first additional downstream band), said first additional frequency band being an additional downstream frequency band, said first additional amplification and processing circuit assembly (1130) being implemented as an insertable module inserted into the amplifier housing (1102) and being electrically coupled to said first spectrum splitter/combiner circuit (1120): and a second spectrum splitter/combiner circuit (1140), mounted in said amplifier housing (1102), said second spectrum splitter/combiner circuit (1140) being coupled to the first amplification and processing circuit assembly (1128) and said first additional amplification and processing circuit assembly (1130).

Exemplary Numbered Embodiment 2. The modular radio frequency (RF) amplifier assembly (1100) of Exemplary Numbered Embodiment 1, further comprising: a power supply (1147) mounted in said amplifier housing (1102) coupled to and supplying power to the first amplification and processing circuit assembly (1128) and the first additional amplification and processing circuit assembly (1130).

Exemplary Numbered Embodiment 3. The modular radio frequency (RF) amplifier assembly (1100) of Exemplary Numbered Embodiment 2, wherein the amplifier housing (1102) includes a backplane (1202) (e.g., circuit board with electrical connectors in the form of slots with pin connectors) including one or more electrical connectors (1204, 1208) (e.g., slots with electrical pins), said electrical connectors (1204, 1208) including a first connector (1204): and wherein the first additional amplification and processing circuit assembly (1130) has a first electrical connector (1206) inserted into the first connector (1204).

Exemplary Numbered Embodiment 4. The modular radio frequency (RF) amplifier assembly (1100) of Exemplary Numbered Embodiment 3, further comprising: a second additional amplification and processing circuit assembly (1132), mounted in said amplifier housing (1102) and being coupled to said first spectrum splitter/combiner circuit (1120) and said second spectrum splitter/combiner circuit (1140), said second additional amplification and processing circuit assembly (1132) being configured to amplify and pass signals in a second additional frequency band (e.g., B3 which is a second additional downstream band), said second additional frequency band (B3) being a second additional downstream frequency band, said second additional amplification and processing circuit assembly (1132) being implemented as a second insertable module inserted into the amplifier housing (1102) and being electrically coupled to said first spectrum splitter/combiner circuit (1120) and said second spectrum splitter/combiner circuit (1140) via a second connector (1210).

Exemplary Numbered Embodiment 5. The modular RF amplifier assembly (1100) of Exemplary Numbered Embodiment 1, wherein said first spectrum splitter/combiner (1120) includes a plurality of diplexers (1350).

Exemplary Numbered Embodiment 6. The modular RF amplifier assembly (1100) of Exemplary Numbered Embodiment 1, wherein said first spectrum splitter/combiner (1120) includes a combination of RF filters (1352) (e.g., at least one low pass filter and one high pass filter).

Exemplary Numbered Embodiment 7. The modular RF amplifier assembly (1100) of Exemplary Numbered Embodiment 1, wherein said first spectrum splitter/combiner (1120) includes hybrid couplers (1353).

Exemplary Numbered Embodiment 8. The modular RF amplifier assembly (1100) of Exemplary Numbered Embodiment 1, wherein said first spectrum splitter/combiner (1120) includes a plurality of RF circulators (1354).

Exemplary Numbered Embodiment 9. The modular RF amplifier assembly (1100) of Exemplary Numbered Embodiment 1, wherein said first amplification and processing circuit assembly (1128) is mounted in a base (1104) of said amplifier housing (1102); and wherein said first additional amplification and processing circuit assembly (1130) is mounted in a cover (1106) of said amplifier housing (1102).

Exemplary Numbered Embodiment 10. The modular RF amplifier assembly (1100) of Exemplary Numbered Embodiment 9, wherein said first spectrum splitter/combiner circuit (1120) and said second spectrum splitter/combiner circuit (1140) are mounted in said base (1104) of said amplifier housing (1102).

Exemplary Numbered Embodiment 10A. The modular RF amplifier assembly (1100) of Exemplary Numbered Embodiment 9, wherein said first amplification and processing circuit assembly (1128), said first spectrum splitter/combiner circuit 1120, and said second splitter/combiner circuit 1140 are included on single circuit board (1402).

Exemplary Numbered Embodiment 10B. The modular RF amplifier assembly (1100) of Exemplary Numbered Embodiment 10A, further comprising: an automatic gain control/automatic level and slope control (AGC/ALSC) circuit (1146) being mounted in said base (1104) of said amplifier housing (1102), said AGC/ALSC circuit (1146) being coupled to and controlling both the first amplification and processing assembly (1128) and said first additional amplification and processing assembly (1130), said AGC/ALSC circuit also being mounted on said single circuit board (1402).

Exemplary Numbered Embodiment 10C. The modular RF amplifier assembly (1100) of Exemplary Numbered Embodiment 9, wherein said first amplification and processing circuit assembly (1128), said first spectrum splitter/combiner circuit (1120), and said second splitter/combiner circuit (1140) are each individual replaceable units, mounted separately within said base (1104) of said amplifier housing (1102).

Exemplary Numbered Embodiment 10D. The modular RF amplifier assembly (1100) of Exemplary Numbered Embodiment 3, wherein said first amplification and processing circuit assembly (1128), said first spectrum splitter/combiner circuit (1120), and said second splitter/combiner circuit (1140) are each individual replaceable units, mounted separately within said base (1104) of said amplifier housing (1102): and wherein said first spectrum splitter/combiner circuit (1120) and said second splitter/combiner circuit (1140), had been selected from a plurality of alternative spectrum splitter/combiners, to accommodate the first additional frequency band corresponding to the 1st additional amplification and processing circuit, said 1st additional amplification and processing circuit having been selected from among a plurality of alternative additional amplification and processing circuits, different alternative amplification and processing circuits corresponding to different frequency blocks.

Exemplary Numbered Embodiment 11. The modular RF amplifier assembly (1100) of Exemplary Numbered Embodiment 10, further comprising: a power supply (1147) mounted in said cover (1106) of said amplifier housing (1102) coupled to and supplying power to the first amplification and processing circuit assembly (1128) and the first additional amplification and processing circuit assembly (1130).

Exemplary Numbered Embodiment 12. The modular RF amplifier assembly (1100) of Exemplary Numbered Embodiment 10, further comprising: an automatic gain control/automatic level and slope control (AGC/ALSC) circuit (1146) being mounted in said base (1104) of said amplifier housing (1102), said AGC/ALSC circuit (1146) being coupled to and controlling both the first amplification and processing assembly (1128) and said first additional amplification and processing assembly (1130).

Exemplary Numbered Embodiment 13. The modular RF amplifier assembly (1100) of Exemplary Numbered Embodiment 1, wherein said first frequency band (B1) and said second frequency band are non-overlapping.

Exemplary Numbered Embodiment 14. The modular RF amplifier assembly (1100) of Exemplary Numbered Embodiment 13, wherein said additional frequency band (B2) includes an integer number of 200 MHz contiguous blocks.

Exemplary Numbered Embodiment 15. The modular RF amplifier assembly (1100) of Exemplary Numbered Embodiment 1, further comprising: a first shield (e.g., Faraday cage) encapsulating said first amplification and processing circuit assembly (1128); and a second shield (e.g., Faraday cage) encapsulating said first additional amplification and processing circuit assembly (1130).

Exemplary Numbered Embodiment 16. The modular RF amplifier assembly (1100) of Exemplary Numbered Embodiment 1, wherein said modular RF amplifier assembly (1100) is a CATV device.

Exemplary Numbered Embodiment 17. The modular radio frequency (RF) amplifier assembly (1100) of Exemplary Numbered Embodiment 2, further comprising: an automatic gain control/automatic level and slope control (AGC/ALSC) circuit (1146) being mounted in said amplifier housing (1102), said AGC/ALSC circuit (1146) being coupled to and controlling both the first amplification and processing assembly (1128) and said first additional amplification and processing assembly (1130).

Exemplary Numbered Embodiment 18. The modular RF amplifier assembly (1100) of Exemplary Numbered Embodiment 17, wherein said AGC/ALSC circuit (1146) includes: a multi-pilot temperature compensation network (1324) implemented to individually control RF operational gain and tilt (slope) over a pre-defined temperature range for each of multiple RF amplification and processing circuit assemblies, said multiple RF amplifications and processing circuit assemblies including said 1st amplification and processing circuit assembly (1128) and said first additional amplification and processing circuit assembly (1130).

Exemplary Numbered Embodiment 19. The modular RF amplifier assembly (1100) of Exemplary Numbered Embodiment 10, wherein said first amplification and processing circuit assembly (1128), said first additional amplification and processing circuit assembly (1130) and said second additional amplification and processing circuit assembly (1132) are each physically separated from one another by at least 2 cm (to provide increased isolation).

Exemplary Numbered Embodiment 20. The modular RF amplifier assembly (1100) of Exemplary Numbered Embodiment 2, wherein said first spectrum splitter/combiner circuit (1120) includes a common port which serves as a first external port (1108) for the modular RF amplifier assembly (1100), and wherein said second splitter/combiner circuit (1140) includes a common port which serves as a second external port (1144) for the modular RF amplifier assembly (1100).

Exemplary Numbered Embodiment 21. The modular RF amplifier assembly (1100) of Exemplary Numbered Embodiment 4, wherein said first amplification and processing circuit assembly (1128) provides amplification for downstream signals in a range of: i) 258 MHz to 1218 MHz or ii) 492 MHz to 1218 MHz or iii) 844 MHz to 1218 MHz; wherein said first additional amplification and processing circuit assembly (1130) provides amplification for downstream signals in a range of 1218 MHz to 1794 MHz: and wherein said second additional amplifier and processing circuit assembly (1132) provides amplification for downstream signals in a range of 1794 MHz to 3.0 GHz.

Various embodiments are also directed to machine, e.g., computer, readable medium, e.g., ROM, RAM, CDs, hard discs, etc., which include machine readable instructions for controlling a machine to implement one or more steps described herein. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A modular radio frequency (RF) amplifier assembly comprising:

an amplifier housing;

a first spectrum splitter/combiner circuit, mounted in said amplifier housing;

a first amplification and processing circuit assembly mounted in said amplifier housing and being coupled to said first spectrum splitter/combiner circuit, said first amplification and processing circuit assembly being configured to amplify and pass signals in a first frequency band, said first frequency band including a first downstream frequency band and an upstream frequency band, said first frequency band being used for both upstream and downstream signals;

a first additional amplification and processing circuit assembly, mounted in said amplifier housing and being coupled to said first spectrum splitter/combiner circuit, said first additional amplification and processing circuit assembly being configured to amplify and pass signals in a first additional frequency band, said first additional frequency band being an additional downstream frequency band, said first additional amplification and processing circuit assembly being implemented as an insertable module inserted into the amplifier housing and being electrically coupled to said first spectrum splitter/combiner circuit;

a second spectrum splitter/combiner circuit, mounted in said amplifier housing, said second spectrum splitter/combiner circuit being coupled to the first amplification and processing circuit assembly and said first additional amplification and processing circuit assembly;

a power supply mounted in said amplifier housing coupled to and supplying power to the first amplification and processing circuit assembly and the first additional amplification and processing circuit assembly; and a second additional amplification and processing circuit assembly, mounted in said amplifier housing and being coupled to said first spectrum splitter/combiner circuit and said second spectrum splitter/combiner circuit, said second additional amplification and processing circuit assembly being configured to amplify and pass signals in a second additional frequency band, said second additional frequency band being a second additional downstream frequency band, said second additional amplification and processing circuit assembly being implemented as a second insertable module inserted into the amplifier housing and being electrically coupled to said first spectrum splitter/combiner circuit and said second spectrum splitter/combiner circuit via a second connector.

2. The modular radio frequency (RF) amplifier assembly of claim 1, further comprising:

a temperature compensation network implemented to individually control RF operational gain over a predefined temperature range for each of multiple RF amplification and processing circuit assemblies, said multiple RF amplification and processing circuit assemblies including said first amplification and processing circuit assembly and said first additional amplification and processing circuit assembly.

3. The modular radio frequency (RF) amplifier assembly of claim 1, wherein the amplifier housing includes a backplane including one or more electrical connectors, said electrical connectors including a first connector; and wherein the first additional amplification and processing circuit assembly has a first electrical connector inserted into the first connector.

4. The modular RF amplifier assembly of claim 1, wherein said first spectrum splitter/combiner circuit includes a plurality of diplexers.

5. The modular RF amplifier assembly of claim 1, wherein said first spectrum splitter/combiner circuit includes a combination of RF filters.

6. The modular RF amplifier assembly of claim 1, wherein said first spectrum splitter/combiner circuit includes hybrid couplers.

7. The modular RF amplifier assembly of claim 1, wherein said first spectrum splitter/combiner circuit includes a plurality of RF circulators.

8. The modular RF amplifier assembly of claim 1, wherein said first amplification and processing circuit assembly is mounted in a base of said amplifier housing; and
wherein said first additional amplification and processing circuit assembly is mounted in a cover of said amplifier housing.

9. The modular RF amplifier assembly of claim 8, wherein said first spectrum splitter/combiner circuit and said second spectrum splitter/combiner circuit are mounted in said base of said amplifier housing.

10. The modular RF amplifier assembly of claim 9, wherein said power supply is mounted in said cover of said amplifier housing.

11. The modular RF amplifier assembly of claim 10, further comprising:
an automatic gain control/automatic level and slope control (AGC/ALSC) circuit being mounted in said base of said amplifier housing, said AGC/ALSC circuit being coupled to and controlling both the first amplification and processing circuit assembly and said first additional amplification and processing circuit assembly.

12. The modular RF amplifier assembly of claim 1, wherein said first frequency band and said second additional frequency band are non-overlapping.

13. The modular RF amplifier assembly of claim 12, wherein said first additional frequency band includes an integer number of 200 MHz contiguous blocks.

14. The modular RF amplifier assembly of claim 1, further comprising:
a first shield encapsulating said first amplification and processing circuit assembly; and
a second shield encapsulating said first additional amplification and processing circuit assembly.

15. The modular RF amplifier assembly of claim 1, wherein said modular RF amplifier assembly is a CATV device.

16. The modular radio frequency (RF) amplifier assembly of claim 1, further comprising:
an automatic gain control/automatic level and slope control (AGC/ALSC) circuit being mounted in said amplifier housing, said AGC/ALSC circuit being coupled to and controlling both the first amplification and processing circuit assembly and said first additional amplification and processing circuit assembly.

17. A modular radio frequency (RF) amplifier assembly comprising:
an amplifier housing;
a first spectrum splitter/combiner circuit, mounted in said amplifier housing;
a first amplification and processing circuit assembly mounted in said amplifier housing and being coupled to said first spectrum splitter/combiner circuit, said first amplification and processing circuit assembly being configured to amplify and pass signals in a first frequency band, said first frequency band including a first downstream frequency band and an upstream frequency band, said first frequency band being used for both upstream and downstream signals;
a first additional amplification and processing circuit assembly, mounted in said amplifier housing and being coupled to said first spectrum splitter/combiner circuit, said first additional amplification and processing circuit assembly being configured to amplify and pass signals in a first additional frequency band, said first additional frequency band being an additional downstream frequency band, said first additional amplification and processing circuit assembly being implemented as an insertable module inserted into the amplifier housing and being electrically coupled to said first spectrum splitter/combiner circuit; and
a second spectrum splitter/combiner circuit, mounted in said amplifier housing, said second spectrum splitter/combiner circuit being coupled to the first amplification and processing circuit assembly and said first additional amplification and processing circuit assembly; and
an automatic gain control/automatic level and slope control (AGC/ALSC) circuit being mounted in said amplifier housing, said AGC/ALSC circuit being coupled to and controlling both the first amplification and processing circuit assembly and said first additional amplification and processing circuit assembly, said AGC/ALSC circuit including:
a multi-pilot temperature compensation network implemented to individually control RF operational gain and tilt over a pre-defined temperature range for each of multiple RF amplification and processing circuit assemblies, said multiple RF amplification and processing circuit assemblies including said first amplification and processing circuit assembly and said first additional amplification and processing circuit assembly.

18. The modular RF amplifier assembly of claim 1, wherein said first amplification and processing circuit assembly, said first additional amplification and processing circuit assembly and said second additional amplification and processing circuit assembly are each physically separated from one another by at least 2 cm.

19. The modular RF amplifier assembly of claim 1, wherein said first spectrum splitter/combiner circuit includes a common port which serves as a first external port for the modular RF amplifier assembly, and wherein said second spectrum splitter/combiner circuit includes a common port which serves as a second external port for the modular RF amplifier assembly.

* * * * *